United States Patent
Boege et al.

(10) Patent No.: US 12,445,704 B2
(45) Date of Patent: Oct. 14, 2025

(54) APPARATUS AND METHODS FOR TRANSMITTING LIGHT

(71) Applicant: ILLUMINA, INC., San Diego, CA (US)

(72) Inventors: Steven Boege, San Mateo, CA (US); Simon Prince, Carlsbad, CA (US); Peter Newman, San Diego, CA (US); Matthew Hage, San Diego, CA (US); Geraint Evans, Cambridge (GB)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 18/750,675

(22) Filed: Jun. 21, 2024

(65) Prior Publication Data
US 2024/0348906 A1    Oct. 17, 2024

Related U.S. Application Data

(63) Continuation of application No. 17/957,659, filed on Sep. 30, 2022, now Pat. No. 12,063,430.

(60) Provisional application No. 63/402,397, filed on Aug. 30, 2022, provisional application No. 63/262,025, filed on Oct. 1, 2021.

(51) Int. Cl.
    *H04N 23/55*    (2023.01)
    *G02B 13/00*    (2006.01)
    *H04N 23/54*    (2023.01)

(52) U.S. Cl.
    CPC ......... *H04N 23/55* (2023.01); *G02B 13/0095* (2013.01); *H04N 23/54* (2023.01)

(58) Field of Classification Search
    CPC ..... H04N 23/55; H04N 23/54; G02B 13/0095
    See application file for complete search history.

(56) References Cited

U.S. PATENT DOCUMENTS

| | | |
|---|---|---|
| 5,982,497 A | 11/1999 | Hopkins |
| 7,466,408 B2 | 12/2008 | Tanaami |
| 8,497,899 B2 | 7/2013 | Kishima |
| 9,911,028 B2 | 3/2018 | Iwase |
| 9,952,430 B2 | 4/2018 | Chen |
| 10,273,521 B2 | 4/2019 | Ashby et al. |
| 10,429,241 B2 | 10/2019 | Mitchell |
| 10,564,408 B2 | 2/2020 | Vartiainen et al. |
| 10,571,664 B2 | 2/2020 | Oishi |
| 10,585,296 B2 | 3/2020 | Owens et al. |
| 10,834,308 B2 | 11/2020 | Zhou et al. |
| 11,054,624 B2 | 7/2021 | Arianpour et al. |

(Continued)

FOREIGN PATENT DOCUMENTS

| | | |
|---|---|---|
| WO | WO-2006/133221 A2 | 12/2006 |
| WO | WO-2021/167044 A1 | 8/2021 |

*Primary Examiner* — Gevell V Selby

(57) ABSTRACT

An apparatus and method for imaging includes an imaging system formed of a movable objective stage proximal to a sample and positioned for providing an excitation beam onto and for capturing an emission from the sample. The movable objective stage includes an optical lens apparatus and a turn reflector optically coupled to the imaging optics, where at least one of the optical lens apparatus and the turn reflector are movable relative to one another for scanning the sample, and wherein the movement is achieved while maintaining a substantially fixed optical path length between the optical lens apparatus and a fixed plane in a fixed imaging optics stage.

37 Claims, 21 Drawing Sheets

(56) References Cited

U.S. PATENT DOCUMENTS

| | | |
|---|---|---|
| 11,092,548 B2 | 8/2021 | Oldham et al. |
| 11,163,145 B2 | 11/2021 | Shiraishi |
| 2008/0100848 A1 | 5/2008 | Kobayashi |
| 2015/0160447 A1* | 6/2015 | Okugawa ............... H04N 23/55 348/79 |
| 2015/0309299 A1 | 10/2015 | Watanabe |
| 2016/0077322 A1 | 3/2016 | Iwase et al. |
| 2016/0377852 A1 | 12/2016 | Hufnagel et al. |
| 2019/0250393 A1 | 8/2019 | Chu et al. |
| 2020/0370962 A1 | 11/2020 | Huang et al. |
| 2021/0080707 A1 | 3/2021 | Zho et al. |
| 2021/0149170 A1 | 5/2021 | Leshem et al. |
| 2021/0396510 A1* | 12/2021 | Kim .................. G01N 21/8851 |

* cited by examiner

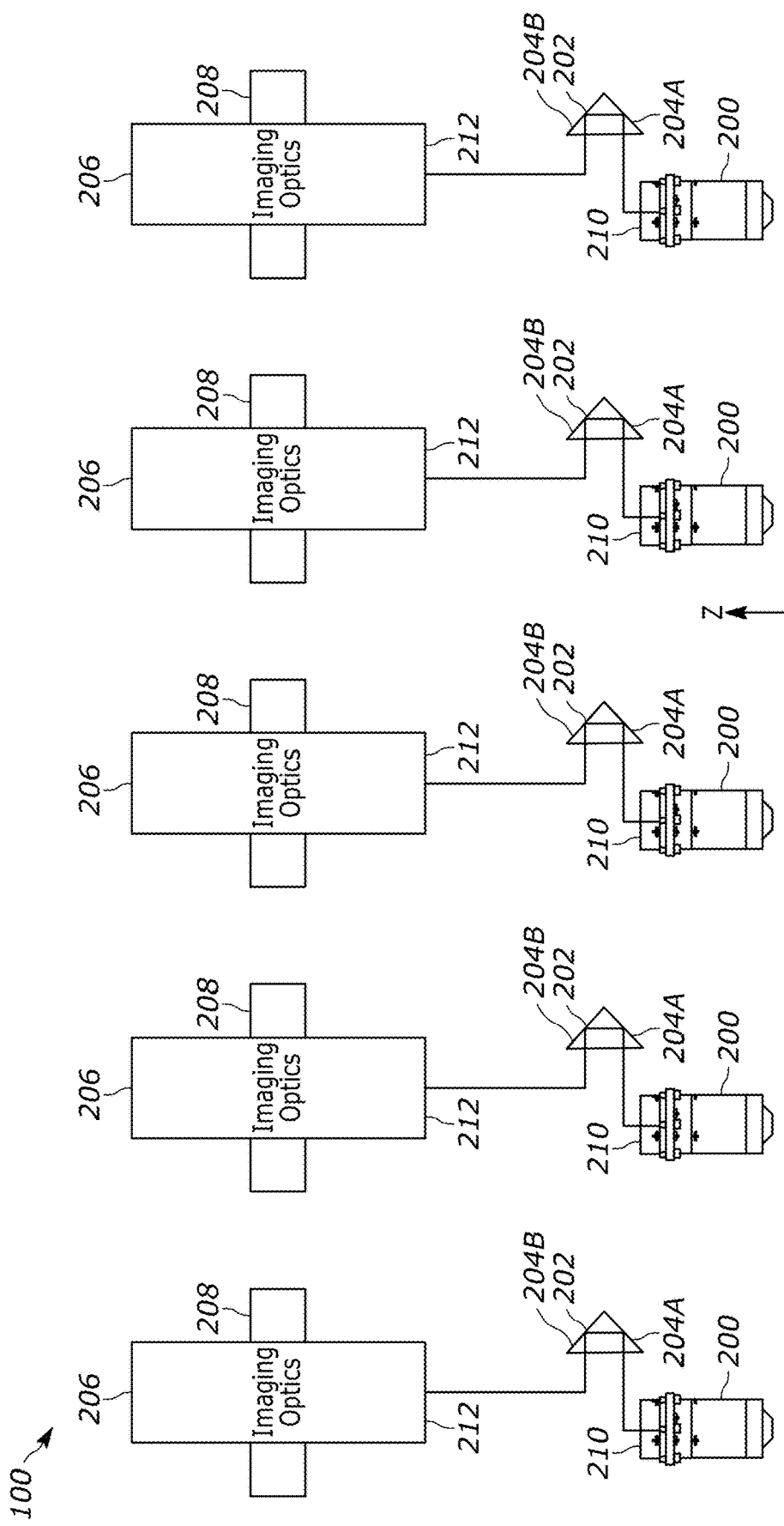

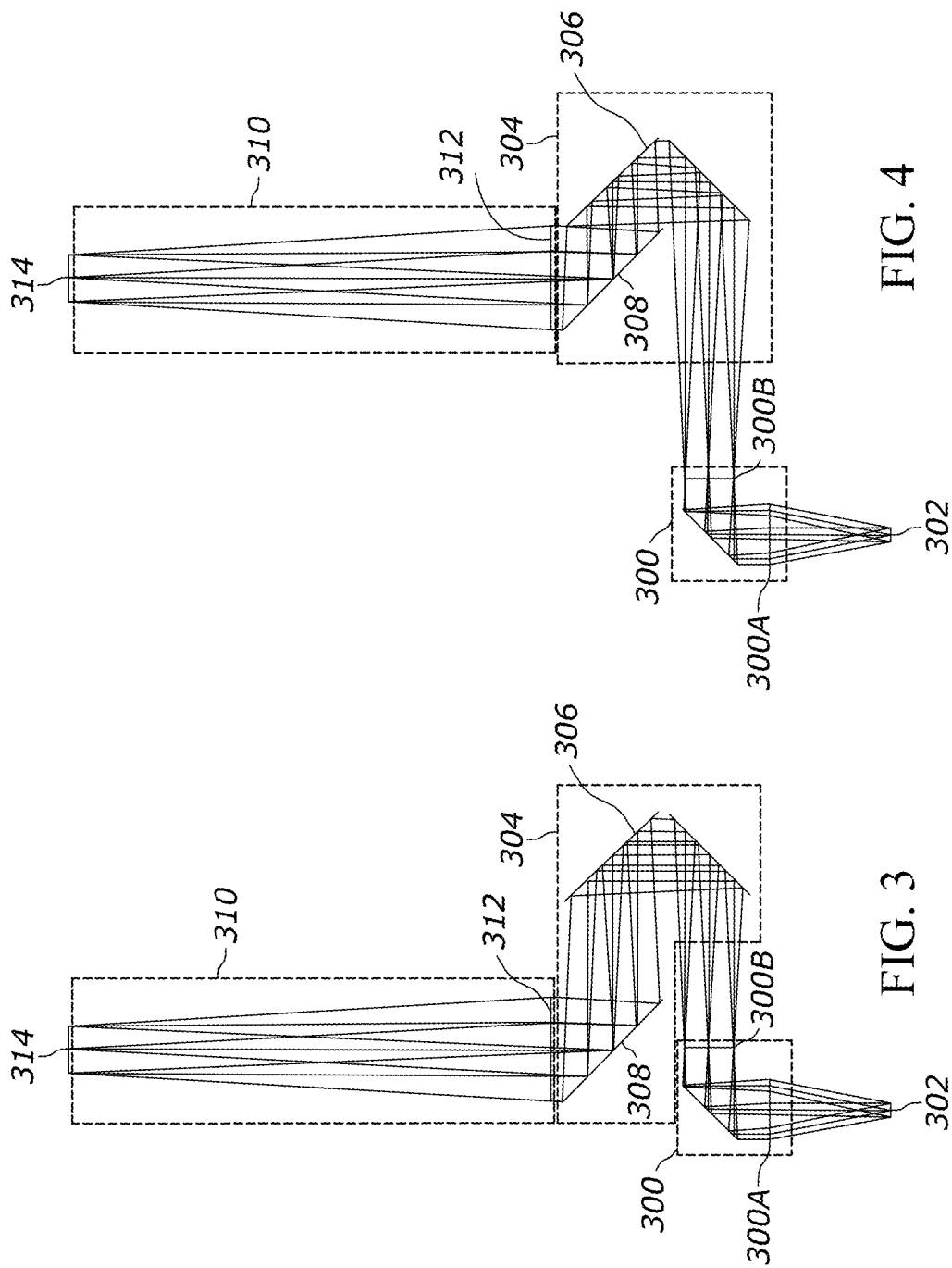

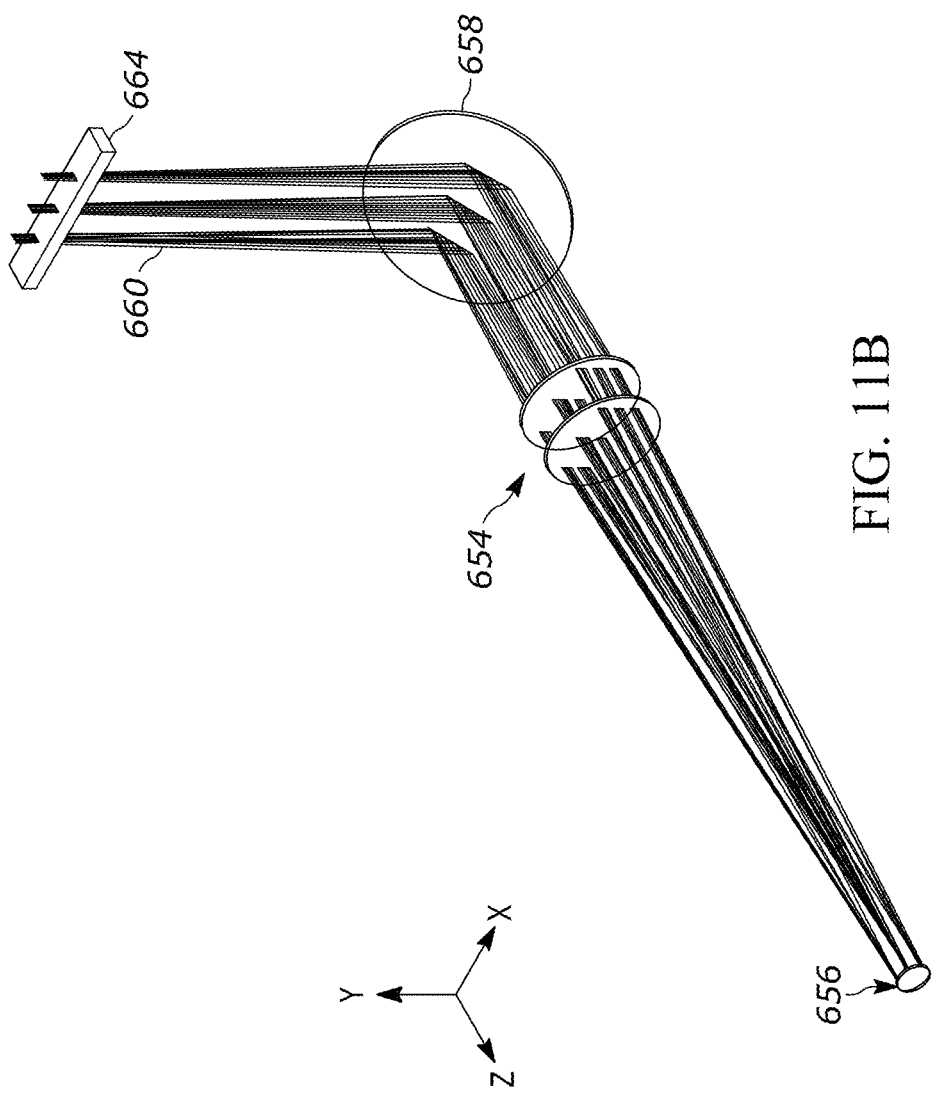

APPARATUS AND METHODS FOR TRANSMITTING LIGHT

RELATED APPLICATION SECTION

This application is a continuation of U.S. patent application Ser. No. 17/957,659, filed Sep. 30, 2022, which claims the benefit of and priority to U.S. Provisional Patent Application No. 63/262,025, filed Oct. 1, 2021, and U.S. Provisional Patent Application No. 63/402,397, filed Aug. 30, 2022, the content of each which is incorporated by reference herein in their entireties and for all purposes.

BACKGROUND

Imaging systems that scan samples, such as high throughput sequencer stations, rely upon movement of the samples relative to the imager assembly or upon movement of the imager assembly relative to the sample to achieve scanning. Such movement requires careful control and precision of the movement and position of the movable components. However, depending on the application, moving the sample can be problematic, especially with large flowcell cartridges having large numbers of fluidic interfaces as these make sample movement relative to fixed optics substantially more challenging. Further, moving optic imagers can be problematic as these imagers are typically large devices that are prone to performance-degrading misalignment when subject over time to numerous acceleration and deceleration events.

SUMMARY

Disadvantages of the prior art can be overcome and benefits as described later in this disclosure can be achieved through the provision of apparatus and methods for transmitting light. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus comprises or includes: an imaging system having an excitation source for generating an excitation beam, a fixed imaging optics stage composed of an excitation source for generating an excitation beam, a sensor for measuring an emission from a sample, and an imaging optics for imaging the emission from the sample onto the sensor; and a movable objective stage proximal to the sample and positioned for providing the excitation beam onto the sample and for capturing the emission from the sample, where the movable objective stage includes an optical lens apparatus and a turn reflector optically coupled to the imaging optics of the fixed imaging optics stage, and where at least one of the optical lens apparatus and the turn reflector of the movable objective stage are movable relative to one another for scanning of the sample, while maintaining a fixed optical path length between the optical lens apparatus and a fixed plane in the fixed imaging optics stage during movement.

In accordance with a second implementation, an apparatus comprises or includes: an imaging system having an excitation source for generating an excitation beam, a fixed imaging optics stage composed of a sensor for measuring an emission from a sample, and imaging optics for imaging the emission from the sample onto the sensor; and an objective stage proximal to the sample and positioned for providing the excitation beam onto the sample and for capturing the emission from the sample, where the objective stage includes an optical lens apparatus, wherein the imaging system comprises (i) one or more color separating elements between the objective and the fixed imaging optics to direct light of a first emission wavelength to a first image sensor of the sensor and light of a second emission wavelength to a second image sensor of the sensor, or (ii) the one or more color separating elements within or after the fixed imaging optics to direct light of the first emission wavelength to the first image sensor and light of the second emission wavelength to the second image sensor.

In accordance with a third implementation, a computer-implemented method of optically probing a sample, the method comprises or includes: aligning, using one or more processors, a movable objective stage, having an optical lens apparatus and a turn reflector optically coupled to imaging optics of a fixed imaging optics stage, to align the optical lens apparatus with the sample for probing at an optical path length; providing, using the optical lens apparatus, an excitation beam to the sample and capturing, using the optical lens apparatus, a fluorescence emission from the sample; in response to identification of a shift in focus at the sample from the fluorescence emission, adjusting a position of the optical lens apparatus or a position of the turn reflector to compensate for the shift; and moving, using the one or more processors, the optical lens apparatus and the turn reflector to position the optical lens apparatus over a subsequent sample for probing, while maintaining the optical path length.

In accordance with a fourth implementation, an apparatus comprises or includes: an excitation source, a movable objective stage, a movable imaging stage, a first actuator, a second actuator, and a controller. The excitation source is for generating a sampling beam. The movable objective stage comprises or includes an objective. The objective stage is configured to receive the sampling beam from the excitation source, project the sampling beam onto a sample, and capture an emission from the sample resulting from the sampling beam. The movable imaging stage comprises or includes an imaging sensor, and imaging optics for imaging the emission from the sample onto the imaging sensor. The first actuator is controllable to move the objective stage between different sample positions and the second actuator is controllable to move the imaging stage. The controller is configured to control the first actuator and the second actuator such that the imaging stage moves counter to the objective stage to allow a length of an optical path between the objective and the imaging sensor to remain substantially constant.

In accordance with a fifth implementation, a method, comprising or including controlling, using one or more processors, a first actuator to move a movable objective stage by a first amount in a first direction to optically align an objective of the objective stage with a sample at a first sample position; controlling, using one or more processors, a second actuator to move a movable imaging stage by the first amount in a second direction opposite the first direction. The imaging stage comprises or includes an imaging sensor, and moving the objective stage and the imaging stage by the first amount in opposite directions maintains a substantially constant optical path length between the objective and the imaging sensor. The method also comprises or includes providing a sampling beam to the objective stage. The objective stage is configured to project the sampling beam onto the sample. The method also comprises or includes imaging, using the objective stage and a pair of turning mirrors, a fluorescence emission from the sample resulting from the sampling beam onto the imaging sensor.

In further accordance with the foregoing first, second, third, fourth, and/or fifth implementations, an apparatus and/or method may further comprise or include any one or more of the following:

In another implementation, the movable objective is movable in two orthogonal directions to maintain a fixed optical path length.

In another implementation, the excitation source comprises or includes a first excitation source producing a first excitation at a first sampling wavelength that elicits a first sample emission range of wavelengths and a second excitation source producing a second excitation at a second sampling wavelength that elicits a second sample emission range of wavelengths, each of the first excitation, first emission, second excitation and second emission having a respective optical path.

In another implementation, the apparatus further comprises or includes: a compensation plate positioned in one of the respective optical paths.

In another implementation, the apparatus further comprises or includes: a compensation plate positioned in a plurality of the respective optical paths.

In another implementation, both the optical lens apparatus and the turn reflector of the movable objective stage are movable relative to one another for scanning of a sample area.

In another implementation, at least one of the optical lens apparatus and the turn reflector of the movable objective stage are movable relative to one another for scanning multiple samples areas at different positions.

In another implementation, the apparatus further comprises or includes: a controller configured to move the at least one of the optical lens apparatus and the turn reflector of the movable objective stage while maintaining the fixed optical path length to sample at the different positions.

In another implementation, the controller is configured to continuously move the optical lens apparatus and the turn reflector of the movable objective between the different positions.

In another implementation, the apparatus further comprises or includes: a controller configured to continuously control movement of the turn reflector during capture of the emission beam from the sample to compensate for vibrational effects during capture.

In another implementation, the apparatus further comprises or includes: a controller configured to continuously control movement of the optical lens apparatus and the turn reflector during capture of the emission beam from the sample to compensate for vibrational effects during capture.

In another implementation, the controller is configured to continuously control movement of the optical lens apparatus and the turn reflector at different movement increments.

In another implementation, the apparatus further comprises or includes: a controller configured to move the movable objective to achieve the fixed optical path length at each of the different sample positions.

In another implementation, the apparatus further comprises or includes: a z-stage adjustment controller to adjust a distance between the optical lens apparatus and the sample.

In another implementation, the fixed imaging optics stage, the optical lens apparatus, and the turn reflector form a relay lens assembly for imaging the emission into the sensor.

In another implementation, the fixed imaging optics stage, the optical lens apparatus, and the turn reflector form an infinite conjugate lens assembly or near infinite conjugate lens assembly.

In another implementation, the fixed imaging optics stage and the optical lens apparatus with the turn reflector each form a finite conjugate lens assembly.

In another implementation, the apparatus further comprises or includes: one or more color separating elements between the objective and the fixed imaging optics to direct light of a first emission wavelength to a first image sensor and light of a second emission wavelength to a second image sensor.

In another implementation, the movable objective stage is separately movable along two orthogonal axes each substantially planar to the sample.

In another implementation, the apparatus further comprises or includes: one or more color separating elements within or after the fixed imaging optics to direct light of a first emission wavelength to a first image sensor and light of a second emission wavelength to a second image sensor In another implementation, the apparatus further comprises or includes: a compensating plate disposed before a first image sensor.

In another implementation, the apparatus further comprises or includes: a plurality of compensating plates disposed before a first image sensor.

In another implementation, the apparatus further comprises or includes: a plurality of compensating plates disposed before a first image sensor and a different compensation plate or plurality of compensating plates is disposed before a second image sensor In another implementation, one or more compensating plates is tilted or wedged.

In another implementation, the movable objective stage is separately movable along two orthogonal axes each substantially parallel to the sample.

In another implementation, the apparatus further comprises or includes a compensating plate disposed before a first image sensor.

In another implementation, the apparatus further comprises or includes a plurality of compensating plates disposed before a first image sensor.

In another implementation, the apparatus further comprises or includes a plurality of compensating plates disposed before a first image sensor and a different plurality of compensating plate disposed before a second image sensor.

In another implementation, the one or more compensating plates is (are) tilted or wedged.

In another implementation, the apparatus further comprises or includes a compensating plate pair disposed within a beam path defined by the one or more color separating elements.

In another implementation, the compensating plate pair comprises a first compensating plate tilted in a first angular direction and a second compensating plate tilted in a second angular direction, equal and opposite to the first angular direction.

In another implementation, the one or more color separating elements are tilted about a first axis and the first compensating plate and the second compensating plate are each tilted about a second axis orthogonal to the first axis and to the optical axis.

In another implementation, the method further comprises or includes moving, using the one or more processors, the optical lens apparatus and the turn reflector to position the optical lens apparatus over the subsequent sample for probing while maintaining the optical path length throughout the movement from the sample to the subsequent sample.

In another implementation, the method further comprises or includes performing imaging processing on image data containing the fluorescence emission; and in responding to determining the image data does not satisfy a focusing condition, adjusting a vertical distance between the optical lens apparatus and the sample until the image data satisfies the focusing condition.

In another implementation, the method further comprises or includes, moving the optical lens apparatus and the turn reflector to position the optical lens apparatus over the subsequent sample for probing, while maintaining the optical path length comprises moving the optical lens apparatus and the turn reflector in a plane substantially parallel to a plane containing the sample and the subsequent sample.

In accordance with an implementation, the apparatus comprises or includes coupling optics positioned between the objective stage and the imaging stage along the optical path.

In accordance with another implementation, the coupling optics are fixed.

In accordance with another implementation, the coupling optics comprise or include a pair of turning mirrors positioned between the objective stage and the imaging stage along the optical path.

In accordance with another implementation, the turning mirrors comprise or have faces positioned at approximately 45° angles.

In accordance with another implementation, the controller is configured to cause the first actuator to move the objective stage toward the coupling optics and cause the second actuator to move the imaging stage away from the coupling optics.

In accordance with another implementation, the controller is configured to cause the first actuator to move the objective stage away from the coupling optics and cause the second actuator to move the imaging stage toward the coupling optics.

In accordance with another implementation, the imaging optics of the imaging stage comprise or include relay optics.

In accordance with another implementation, the objective stage comprises or includes imaging optics comprising or including relay optics.

In accordance with another implementation, the relay optics of the imaging stage and the relay optics of the objective stage reshape at least one of the sampling beam or emission to compensate for spatial dispersion.

In accordance with another implementation, at least one of the first actuator or the second actuator comprises or includes a drive motor, a linear motor, a voice coil motor, a ball screw, a stepper motor, or a belt drive.

In accordance with another implementation, the first actuator and the second actuator comprise or include a shaft comprising or having a first threaded portion and a second threaded portion, corresponding first and second ball nuts, and a motor to rotate the shaft. The imaging stage carrying the first ball nut and the objective stage carrying the second ball nut.

In accordance with another implementation, the first threaded portion comprises or has threads facing a first direction and the second threaded portion comprises or has threads facing a second direction different from the first direction.

In accordance with another implementation, the motor rotates the shaft in a first direction and causes the first ball nut and the second ball nut to move toward one another and the motor rotates the shaft in a second direction and causes the first ball nut and the second ball nut to move away from one another.

In accordance with another implementation, the objective stage further comprises or includes second coupling optics.

In accordance with another implementation, the coupling optics comprise or include a first pair of turning mirrors and the second coupling optics comprise or include a second pair of turning mirrors.

In accordance with another implementation, one of the second pair of turning mirrors redirects the sampling beam onto the sample.

In accordance with another implementation, the other of the second pair of turning mirrors redirects the emissions from the sample toward the first pair of turning mirrors.

In accordance with another implementation, the coupling optics comprise or include a pair of turning mirrors and the second coupling optics comprise or include a second turning mirror.

In accordance with another implementation, the second turning mirror redirects the sampling beam onto the sample.

In accordance with another implementation, the second turning mirror redirects the emissions from the sample toward the first pair of turning mirrors.

In accordance with another implementation, the objective stage, the first actuator, the imaging stage, and the second actuator are configured and arranged such that a first center of mass of the objective stage and a second center of mass of the imaging stage move along substantially a same axis.

In accordance with another implementation, the objective stage, the first actuator, the imaging stage, and the second actuator are configured and arranged such that moving the objective stage and the imaging stage at a same time results in substantially no net force applied to the apparatus.

In accordance with another implementation, controlling the first actuator comprises or includes controlling the first actuator to move the objective stage towards a pair of turning mirrors, and controlling the second actuator comprises or includes controlling the second actuator to move the imaging stage away from the pair of turning mirrors.

In accordance with another implementation, the first actuator comprises or includes controlling the first actuator to move the objective stage towards a midline of the pair of turning mirrors, and controlling the second actuator comprises or includes controlling the second actuator to move the imaging stage away from the midline of the pair of turning mirrors.

In accordance with another implementation, the first actuator and the second actuator comprise or include a shaft comprising or having a first threaded portion and a second threaded portion, corresponding first and second ball nuts, and a motor to rotate the shaft and controlling the first and second actuators comprises or includes controlling the motor to rotate the shaft such that the objective stage moves in the first direction, and the imaging stage moves in the second direction.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

FIGS. 2A-2E illustrate an objective lens apparatus and turn reflector in different positions while maintaining fixed the optical path length with an imaging in accordance with the teachings of this disclosure FIGS. 3 and 4 illustrate a schematic of an objective lens apparatus and a turn reflector, both of a movable objective stage, in different positions, while maintaining fixed the optical path length with an imaging in accordance with the teachings of this disclosure.

FIGS. 11A-11D illustrate an example turn reflector assembly having compensation plates for compensating for different induced spatially separated beam paths between a fixed imaging optics and sensors in accordance with teachings of this disclosure.

DETAILED DESCRIPTION

Figure 1:
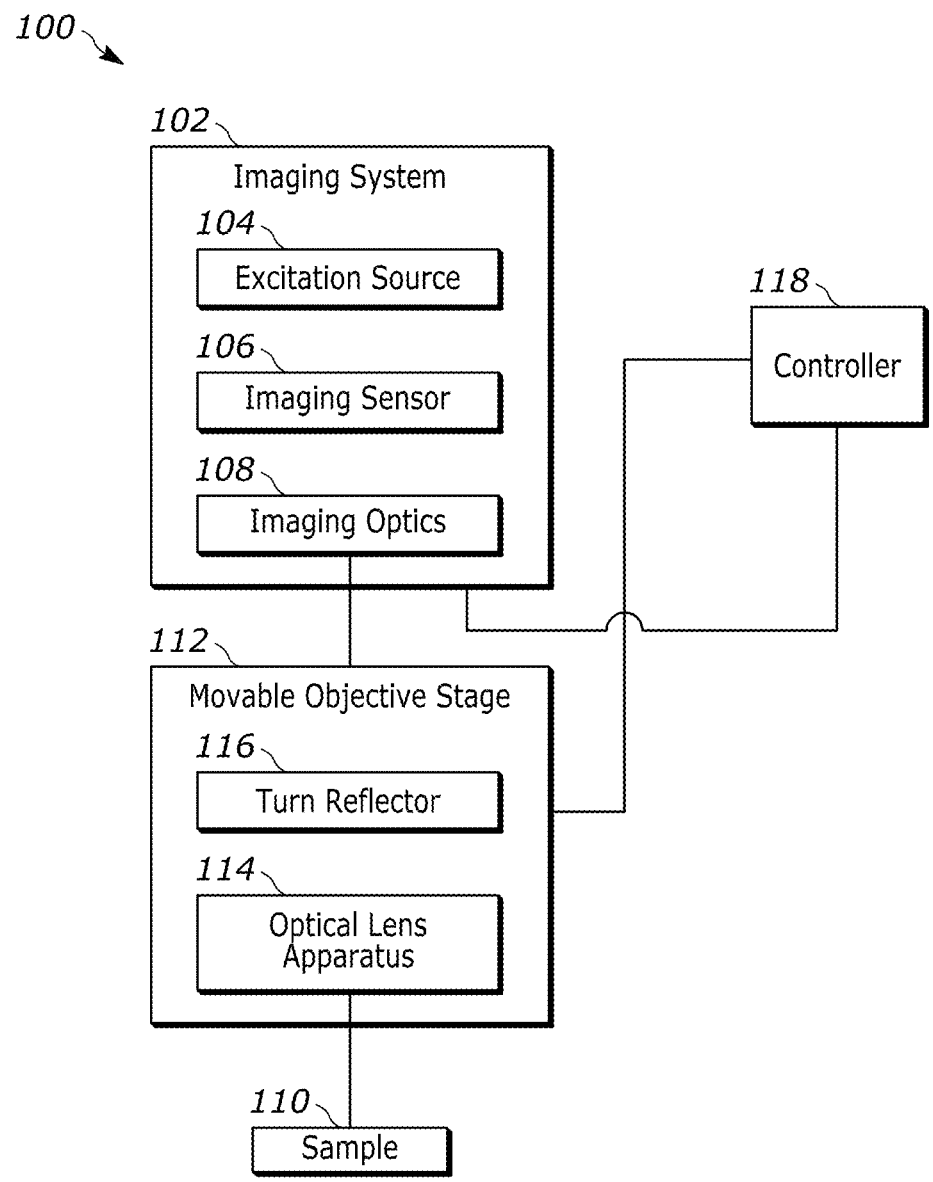
FIG. 1 illustrates a schematic diagram of an implementation of an optical imager apparatus in accordance with the teachings of this disclosure, showing an imaging system with fixed imaging optics and a moveable objective stage.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

At least one aspect of this disclosure is directed to an apparatus and method for imaging. The apparatus may include an imaging system that eliminates the need to move either the sample or the entire imager assembly itself, as with conventional techniques. Instead, the apparatus may be designed to move only optics proximate to the sample, while maintaining the bulk of the imager assembly in a fixed position. The imaging system can operate faster, more accurately, and in a smaller footprint construction, as a result. To achieve the beneficial motion, the apparatus may include a fixed imaging optics stage formed of an excitation source that produces an excitation beam. The apparatus may further include a movable objective stage proximal to the sample and positioned for providing the excitation beam onto the sample and for capturing an emission from the sample. The movable objective stage may include an optical lens apparatus and a turn reflector optically coupled to the imaging optics. Further, at least one of the optical lens apparatus and the turn reflector are movable relative to one another for scanning the sample. In some implementations, such movement is achieved during scanning of the sample. In some implementations, such movement is achieved while moving from one sample position to another sample position to scan a different sample at another position. The movement in the foregoing implementations is achieved while maintaining a fixed optical path length between the optical lens apparatus and a fixed plane in the fixed imaging optics stage, so as not to alter performance of the imaging optics stage.

In some implementations, the imaging system is movable in two orthogonal directions, for example, to maintain a fixed optical path length for sampling beams of different wavelengths, i.e., for multi-spectral imaging. In some implementations, compensation plates are included within the optical path to facilitate multi-spectral imaging. In some implementations, compensation plates are separate, dedicated plates to compensate for different excitation beam paths in a multi-spectral imaging example. In some implementations, compensation plates are integrated with turn reflectors. In some implementations, compensation for differences in sampling beam wavelength is achieved through different dedicated turn reflector assemblies, one for each excitation beam.

FIG. 1 illustrates a schematic diagram of an example implementation of the techniques herein. FIG. 1 illustrates an optical imager apparatus 100 that, in accordance with an example, includes an imaging system 102 that includes an excitation source 104, an imaging sensor 106, and imaging optics 108. At least the imaging optics 108 is formed as a fixed imaging optics stage that does not move relative to a sample 110. For example, the imaging optics 108 may be in fixed position engagement with a housing, frame, or other support of the imaging system 102. In some implementations, one or both of the excitation source 104 and the imaging sensor 106 are also part of the fixed imaging optics stage that does not move relative to the sample 110. For example, the excitation source 104, the imaging sensor 106, and the imaging optics 108 may be in a fixed position engagement with the housing, frame, or other support of the imaging system 102.

The excitation source 104 generates an excitation beam and may be a laser source, light emitting diode, or other illumination excitation source. In some implementations, the excitation source 104 generates an excitation beam having a single central wavelength. In some implementations, the excitation sources 104 are formed of two or more excitation sources each producing a respective excitation at a different wavelength. The sensor 106 receives an emission from the sample and may be any solid-state imaging device, such as a include a charge coupled device (CCD) and/or a complementary metal oxide semiconductor (CMOS), or any suitable imager that may be used in fluorescence spectroscopy.

Contrasting to the imaging optics 108, in the illustrated implementation, the optical image apparatus 100 further includes a movable objective stage 112 optically coupled to the imaging system 102. In the illustrated example, the movable objective stage 112 includes an optical lens apparatus 114 that is proximal to the sample 110 and a turn reflector 116 optically coupling the optical lens apparatus 114 and the imaging optics 108. Unlike the imaging optics 108 which is maintained in a fixed position, the optical lens apparatus 114 is movable under control of a controller 118, where that movement is controlled to maintain a fixed optical path length between the optical lens apparatus 114 and the imaging optics 108 or, more specifically, a fixed plane within the imaging optics 108.

FIGS. 2A-2E illustrate examples of an optical lens apparatus 200, e.g., a magnifying optical assembly, and a turn reflector 202 formed of two mirrors 204A & 204B joining to form a corner reflector. The optical lens apparatus 200 and the turn reflector 202 may form a movable objective stage, for example. In the illustrated examples, imaging optics 206 is provided as part of an imaging system, where that imaging optics 206 is maintained in place on a frame 208, partially shown. As shown, in FIG. 2A, a central axis of the optical lens apparatus 200 is laterally spaced from a central axis of the imaging optics 206 by a first spacing distance, in this example 80 mm. The optical path between the exist face 210 of the optical lens apparatus 200 and the entry face 212 of the imaging optics 206 is 160 mm. As both the optical lens apparatus 200 and the turn reflector 202 are moved, that optical path length stays constant as 160 mm, but the lateral position and spacing distance between the two changes. Indeed, in each of the examples, the optical lens apparatus 200 moves relative to the imaging optics 206, where only in the position of FIG. 2C is the central axis of the later aligned with the central axis of the former. The examples of FIGS. 2A-2E show each of the optical lens apparatus 200 and the turn reflector 202 moving relative to the fixed imaging optics 206 and movable along the y-axis. In some implementations, only one the optical lens apparatus 200 and the turn reflector 202 may be movable relative to the imaging optics 206. For example, the optical lens apparatus 200 may be maintained in a fixed position relative to a sample, and only the turn reflector 202 is movable along the y-axis. In this case, the path length is no longer constant, but the path length change is less than it would be without the turn reflector 202.

FIGS. 3 and 4 illustrate two different positions of a movable objective stage and illustrate a constant optical path for each. An optical lens apparatus 300 has an entrance face 300A (e.g., corresponding to a first lens element) and an exit face 300B (e.g., corresponding to a second lens element) and is positioned to capture an emission from a sample plane 302. A turn reflector 304 is formed of a right angle reflector 306 and an exit reflector 308. In some examples, the right angle reflector 306 is a prism reflector or two air-spaced mirrors. An imaging optics stage 310 is shown optically coupled to the turn reflector 304 and formed of a tube lens 312 focusing the emission from the sample plane 302 on a sensor 314, where the imaging optics 310 and sensor 314 are maintained in a fixed position in both FIGS. 3 and 4. As illustrated, in various implementations, the imaging optics stage 310 and the optical lens apparatus 300 and turn reflector 304 form a relay lens assembly for imaging the emission from the sample plane 302 onto the into the sensor 314. In some implementations, the imaging optics stage 310 and the optical lens apparatus 300 and turn reflector 304 form an infinite or near-infinite conjugate lens assembly. In some implementations, the imaging optics stage 310 and the optical lens apparatus 300 with the turn reflector 304 each form a conjugate lens assembly.

Figure 5:
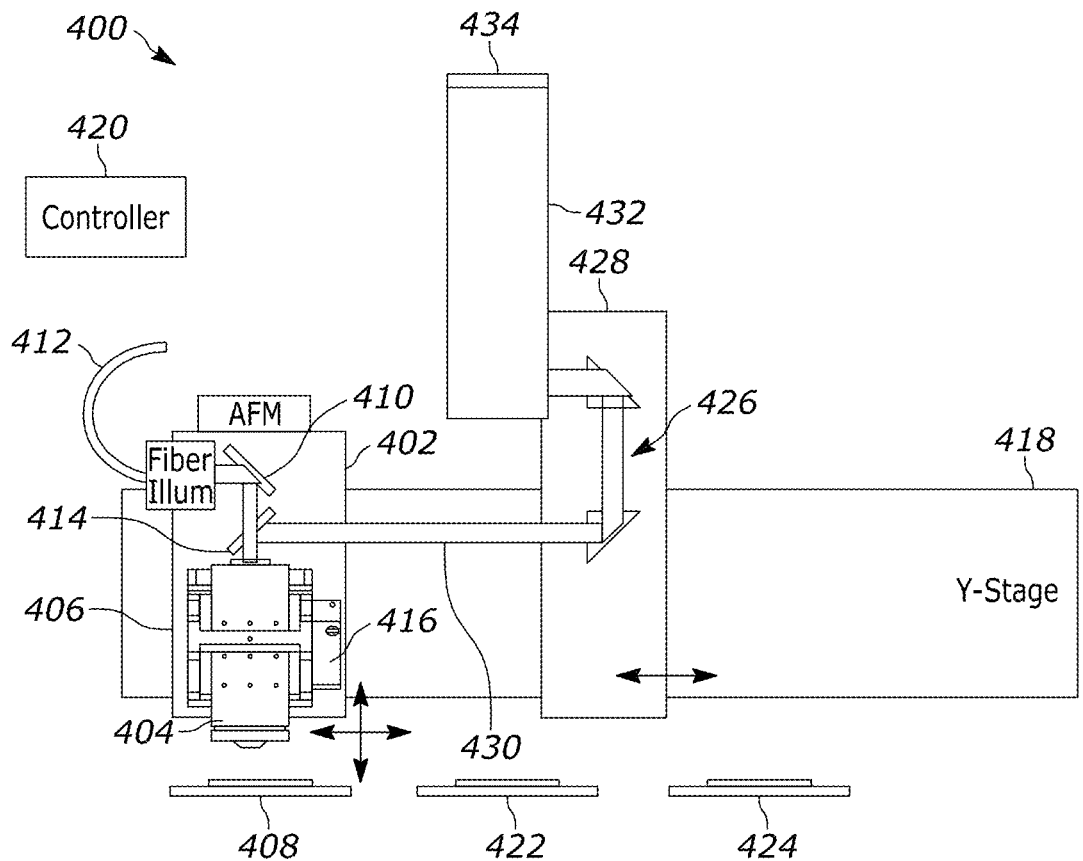
FIGS. 5-7 illustrate different positions of a movable objective stage in accordance with the teachings of this disclosure.
Figure 6:
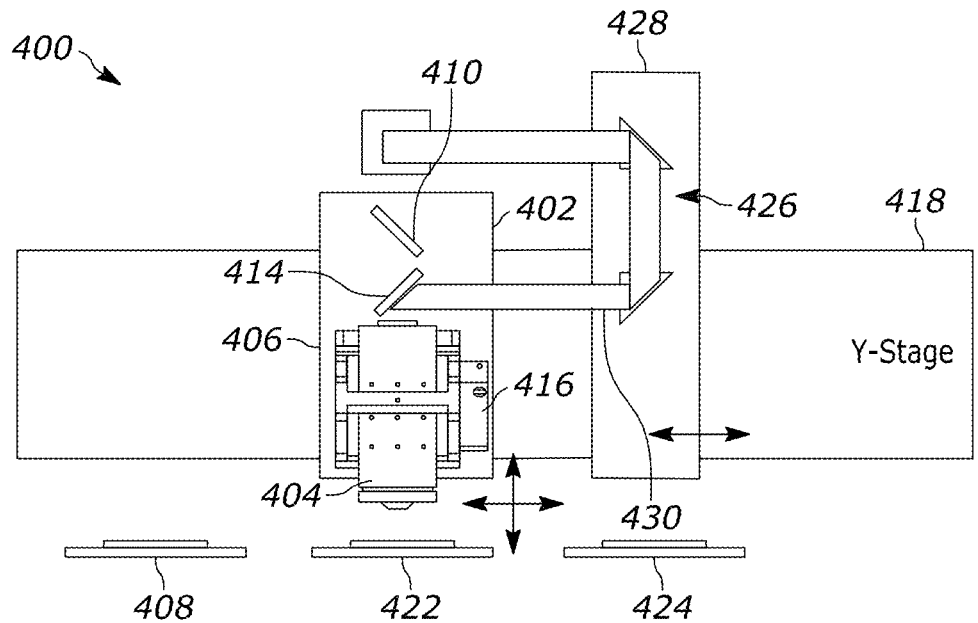
Figure 7:
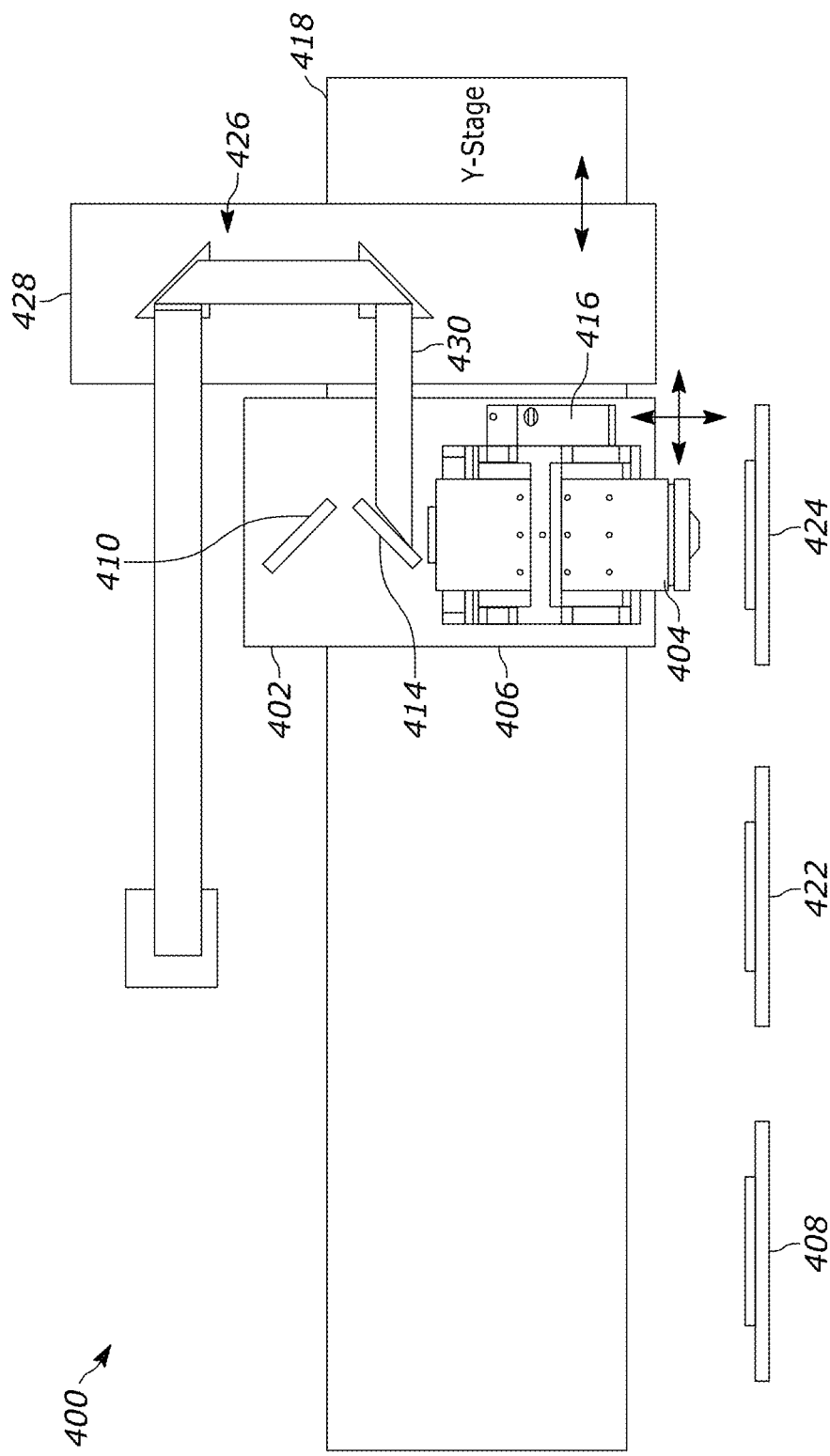

FIGS. 5-7 illustrate another example apparatus 400 for implementing the techniques herein. A movable objective assembly 402 is formed of an optical lens apparatus 404, e.g., an objective lens barrel, mounted on a movable stage carriage 406, for suspending above a sample 408. The movable objective assembly 402 includes a first reflector 410 positioned to receive an excitation beam from an excitation source 412, which may be an illumination fiber or any other suitable excitation source, and direct that excitation beam through a dichroic mirror 414 into the optical lens apparatus 404 for scanning the sample 408. In the illustrated example, the movable objective assembly 402 includes a Z-axis stage 416 and the movable stage carriage 406 positionable along a Y-axis stage 418, each controlled by a controller 420 to move the movable objective assembly 402 along the respective axes. FIG. 5 illustrates the apparatus 400 in a first position for scanning the sample 408 at a first position. FIGS. 6 and 7 illustrate the apparatus 400 in second and third positions for scanning samples 422 and 424 at respective second and third positions.

In addition to the movable objective assembly 402, a turn reflector 426 is mounted to a movable stage carriage 428 positionable along the Y-axis stage 418 under control of the controller 420, where during operation the turn reflector 426 receives an emission beam 430 of the sample from the dichroic mirror 414 and provides that emission beam 430 to a fixed imaging optics stage 432 for capturing at a sensor 434. The movable objective assembly 402 and the turn reflector 426, and their respective carriages and moving assemblies form a movable objective stage. In each of the positions in FIGS. 5-7, stages 406 and 428 have been moved relative to one another, while the imaging optics stage 432 has remained fixed, to maintain a constant optical path length. The movable stages 406 and 428 may deploy servo controls to control operation. In other embodiments, the movable carriage 428 may be positioned along a separate stage parallel to Y-axis stage 418.

While not shown, the controller 420 (or any of the controllers described and/or illustrated herein) may include one or more processors and one or more computer readable memories storing instructions that may be executed by the one or more processors to perform various functions including the disclosed implementation. The controller 420 may include a user interface and a communication interface, electrically and/or communicatively coupled to the one or more processors, as are the one or more memories.

In an implementation, the user interface may be adapted to receive input from a user and to provide information to the user associated with the operation of the apparatus 400. The user interface may include a touch screen, a display, a keyboard, a speaker(s), a mouse, a track ball, and/or a voice recognition system. The touch screen and/or the display may display a graphical user interface (GUI).

In an implementation, a communication interface is adapted to enable communication between the apparatus 400 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the apparatus 400.

The one or more processors of the controller 420 may include one or more of a processor-based system(s) or a microprocessor-based system(s). In some implementations, the one or more processors includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The one or more memories can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 8:
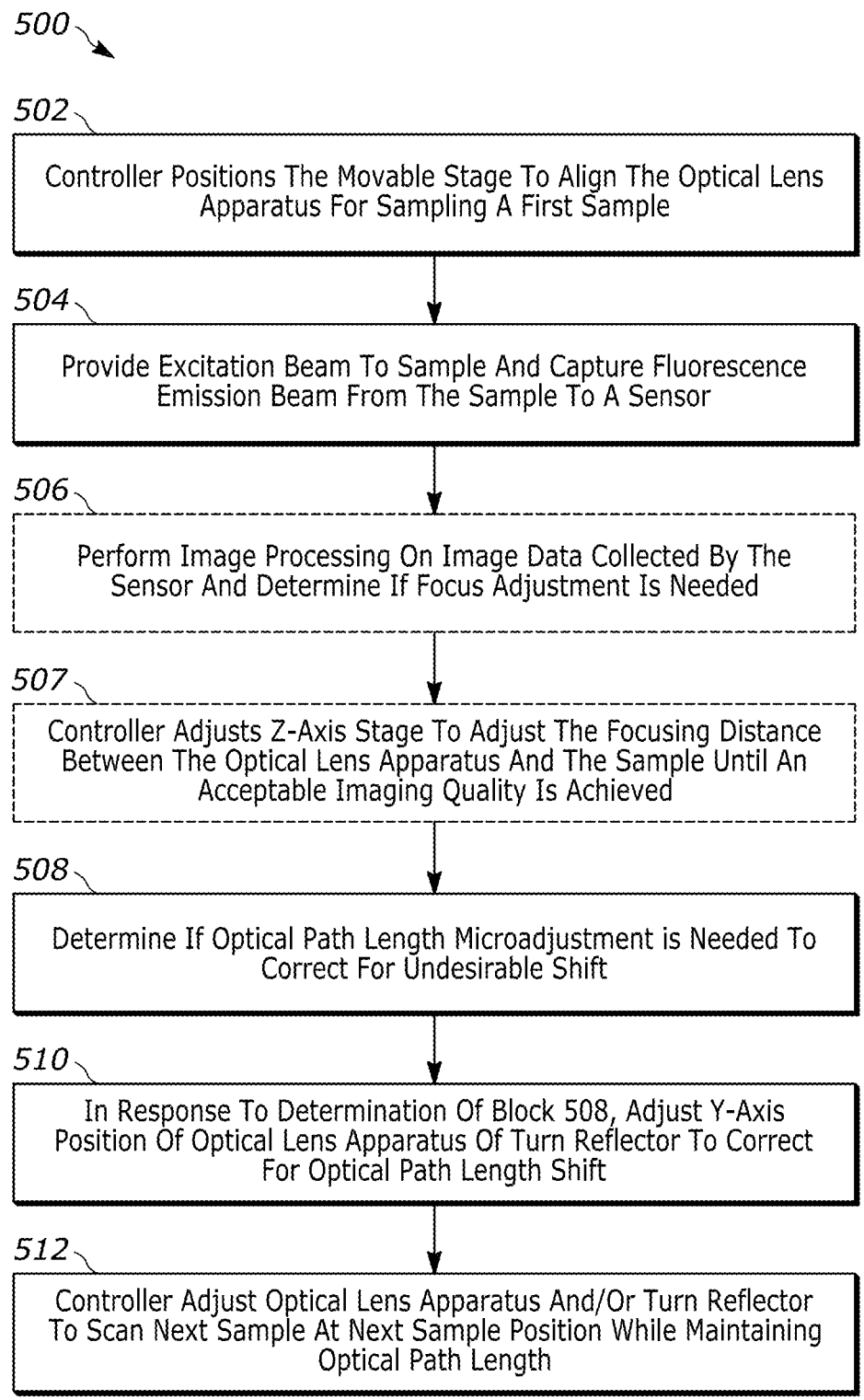
FIG. 8 is a flow diagram of an example process for moving a movable objective stage while maintaining a fixed optical path length in accordance with the teachings of this disclosure.

FIG. 8 illustrates an example method 500 of operation of the apparatus 400. At a block 502 the controller 420 controls the Y-axis position of the movable stage 406 to align the optical lens apparatus 404 with the sample 408 for scanning. At block 504, an excitation beam from the excitation source 412 is provided to the sample 408 and an emission beam is captured by the optical lens assembly 404 and provided to the sensor 434. In an example implementation, optional image processing is performed at a block 506 on image data from the sensor 434 to determine if the sample is in sufficient focus, i.e., if the Z-axis distance between the optical lens assembly 404 and the sample is within a range of acceptable imaging quality. If it is determined that an adjustment to the distance is needed, at optional block 507, the controller 420 controls the Z-stage 416 to adjust the distance until an acceptable imaging quality is achieved. In some examples, the block 507 is performed to achieve an initial desired image quality. In some examples, the block 507 may be used to correct for vibrational effects or other anomalies that affect image quality during emission capture. In some examples, at the block 507, the controller 420 may adjust the turn reflector, e.g., stage 428, to achieve a desired initial image quality and/or to compensate for vibrational effects. In some examples, the controller 420 may adjust both the Z-stage 416 and one or both of the stages 406 and 428 to compensate for vibrational effects. In some examples, the controller 420 may adjust one or both of the stages 406 and 428 to compensate for vibrational effects.

With the Z-axis position of the movable objective stage 402 established, at a block 508, the image data is assessed to determine if an adjustment to the optical path length from the sample 408 to the sensor 434 is needed. For example, the optical path length may change from a desired value, if the apparatus 400 experiences optical jitter or if there is drift of one of the movable stages or if the sample has moved, or due to other anomalies. In response, at a block 510, the controller adjusts one of the movable stage 406 and or 428 to correct for the change in the optical path length. For example, the controller 420 may control the movable stage 428 to move the turn reflector 426 relative to the optical lens apparatus 404 to correct for changes in the optical path length during scanning of the sample 408.

Once the sample 408 has been scanned, at a block 512, the controller 420 controls one or both of the movable stages 406 and 428 to move one or both of the optical lens apparatus 404 or turn reflector 426, respectively, to reposition the apparatus 400 to scan the sample 422, while maintaining the optical path length established during scanning of the sample 408. In some implementations, the controller 420 ensures the optical path length is fixed throughout the movement of the apparatus from the position in FIG. 5 to that of FIG. 6 and to that of FIG. 7, for example. For example, the controller 420 may continuously move the stages 406 and 428, as the apparatus 400 is moved between different scanning positions (e.g., corresponding to positions of samples 408, 422, and 424) while maintaining the optical path length fixed during movement. In some implementations, the optical path length need not be maintained fixed continuously throughout the movement, but rather the controller 420 ensures that when the optical lens apparatus 404 is centered for scanning the sample 408, 422, and 424, the optical path length at each position is the same. The process 500 then repeats with scanning of the second sample and the second position.

In various examples, the controller 420 controls movement of the stages 406 and 428 at different increments. For example, the Y-axis movement of the stage 406 may be performed at different distance increments than the Y-axis movement of the stage 428. The controller 420 may also control the movement along different axes at different increments, for example, controlling Z-axis movement of the stage 416 at different increments than the Y-axis movement of the stage 406.

In various implementations, wavelength-dependent spatial separation may be induced in the apparatuses herein to allow for imaging emissions against two different imaging sensors, each displaced from one another. In some implementations, an optical path compensator is used to establish optical path length matching between the two spatially separated emission beams.

In various implementations, the excitation source may include multiple excitation sources, each producing an excitation beam at a different wavelength, and corresponding the emissions captured from the sample may be at different wavelengths. Therefore, in some implementations, the apparatuses herein compensates for the differences in emissions and different optical paths lengths experienced by the emissions, while still maintaining fixed optical paths lengths during sample scanning, during movement to different sampling positions, and/or during scanning at the different sampling positions. In some implementations, this multiple-emission optical path length control is facilitated by the use of multiple imaging sensors displaced from one another.

In any of these implementations, examples of which are shown in FIGS. 9, 10, and 11A-22D, compensation and/or wavelength separation may be achieved in an infinite space region of the apparatus, such as between an exist face 210 of the optical lens apparatus 200 and the entry face 212 of the imaging optics 206. In yet other implementations of the examples of FIGS. 9, 10, and 11A-22D, compensation and/or wavelength separation may be achieved in converging space, such as between the imaging optics 206 and the one or more imaging sensors 106.

Figure 9:
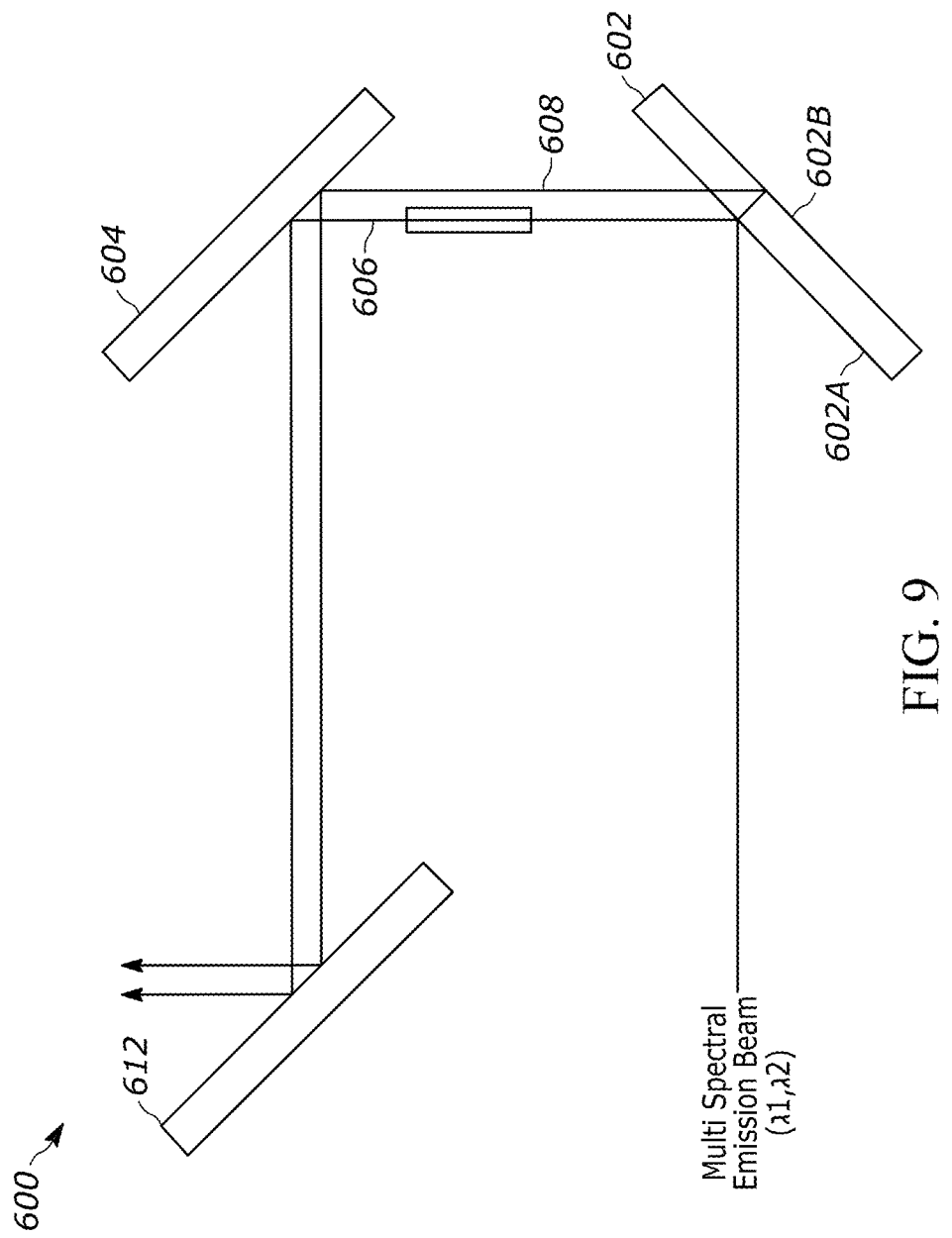
FIG. 9 illustrates an example turn reflector having a compensation plate for compensating for multi-spectral emissions in accordance with the teachings of this disclosure.
Figure 10:
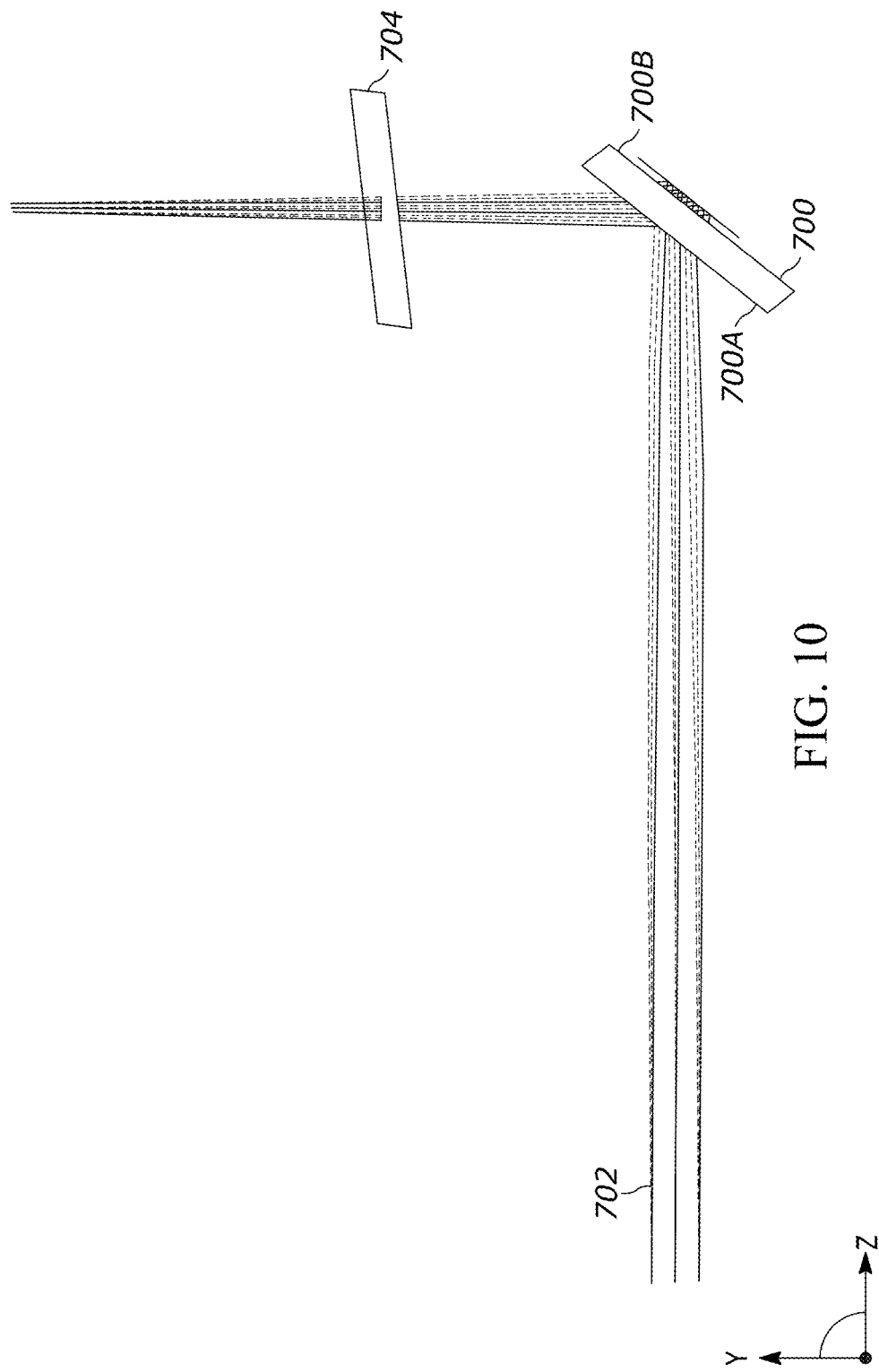
FIG. 10 illustrates an example of compensation plate configuration for correcting for astigmatism in accordance with the teachings of this disclosure.

FIG. 9 illustrates a turn reflector 600 formed of two angled reflectors 602 and 604 forming a right-angle reflector that may be used in infinite space or converging space. In an example, the turn reflector 600 is moveable along a Y-axis, although the moveable stage is not shown. To compensate for a multiple wavelength emission beam, the first reflector 602 is a dichroic designed to induce spatial separation of the emission beam into a first reflected wavelength beam from a first surface 602A and a second reflected wavelength beam from a second surface 602B, generating two different beam paths 606 and 608, one for each emission wavelength beam. In an implementation where this wavelength-based separation takes place after the lens 210 and before the imaging optics 206, to compensate for an optical path length difference imposed by the dichroic reflector 602, a transparent optical compensation plate 610 is introduced into the beam path 606, bring both beams into phase again. In some examples, the optical length and material of the optical compensation plate 610 are determined based on the desired wavelength of the emission reflected at the first surface 602A and the amount of the optical path length delay induced by the size of the spacing gap of the surfaces 602A and 602B and the wavelength of the emission reflected at the second surface 602B. In various implementations, the compensation plate 610 is an electro-optic compensator where the amount of optical compensation is controlled by signals from a controller (not shown). In various implementations where the wavelength-based separation takes place in a converging space between the imaging optics 206 and the one or more imaging sensors 106. In various implementations, the compensation plate 610 may be a clocked compensator.

Because of the compensation plate 610, the two spatially separated emission beam paths 606 and 608 are incident with the same optical path entering an exit reflector 612 that couples the emission beams into the fixed imaging optics (not shown) or into spaced apart sensors 614 and 616, depending on the implementation. In an example implementation in converging space, the sensors 614 and 616 may each be configured to capture a different emission wavelength (e.g., positioned in offset locations, provided with a wavelength bandpass filter, or using other configuration). While the reflector 602 is shown as a dichroic, in some implementations the reflector 604 may be a dichroic. In some implementations both reflectors 602 and 604 may be dichroic reflectors. Further, in some implementations, the compensation plate 610 is positioned after the reflector 604, e.g., before the exit reflector 612, to ensure that the two emission beams have the same optical path length. In some examples, an aperture may be introduced into one or both of the beam paths 606 and 608 to prevent unwanted beam divergence and to ensure the optical lens apparatus proximal to the sample and the fixed imaging optics proximal to the sample form a sufficiently high-resolution relay lens configuration. For example, one or more apertures may be introduced to ensure the beam paths 606 and 608 properly coincide with an entrance aperture of the fixed imaging optics.

In some implementations, one of more of the reflectors forming a turn reflector herein is designed to reflect an emission off of a back surface, whether as a uniform wavelength reflector or a dichroic. In some such examples, depending upon reflector geometry and the length of the optical paths from the optical lens apparatus through the fixed imaging optics, such reflectors may introduce an astigmatism on the emission. Therefore, to compensate, in some examples, a tilted compensation plate is used in the optical beam path of the emission. An example configuration in shown in FIG. 10, in which a first reflector 700 reflects a single or multi-spectral) incident beam 702 off a back surface mirror 700B (e.g., a mirror positioned on or near the back surface of the reflector 700). A compensation plate 704 is positioned to receive the emission and titled to correct for an astigmatism introduced by the reflector 700. For example, the compensation plate 704 may be tilted an equal and opposite amount to that of the reflector 700 compensating for the astigmatism within the turn reflector, e.g., before the emission is incident on the second turn reflector (not shown).

Figure 11A:
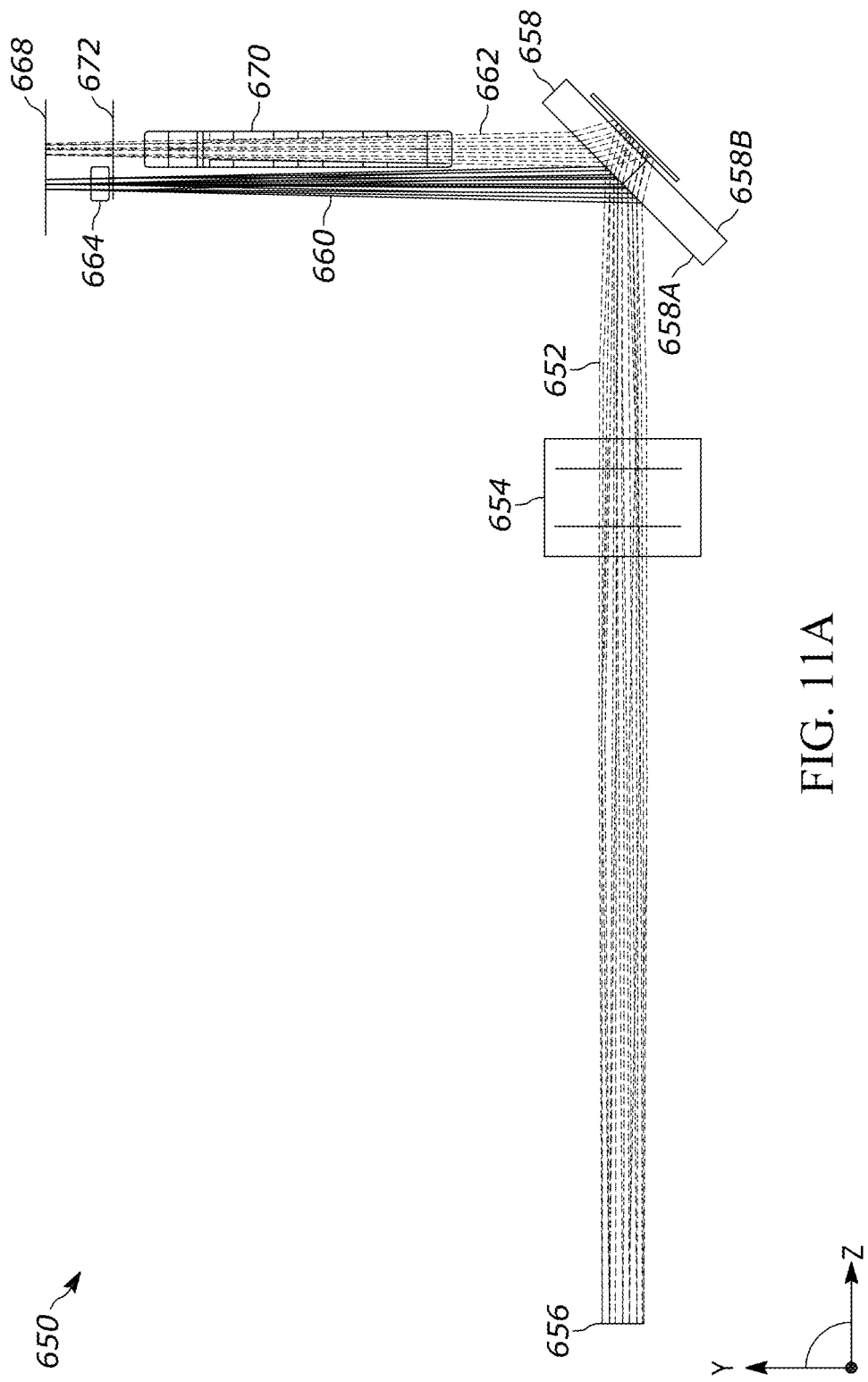
Figure 11C:
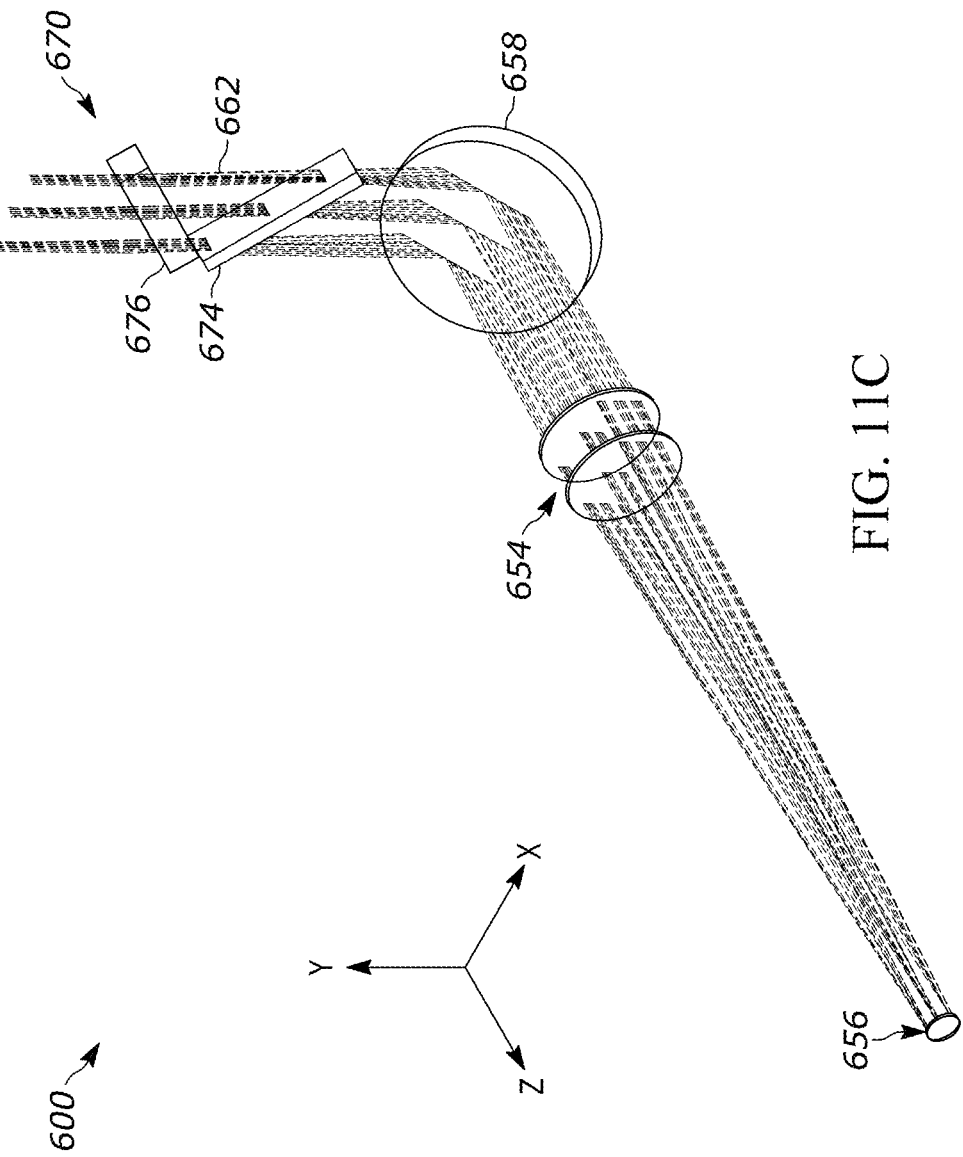
Figure 11D:
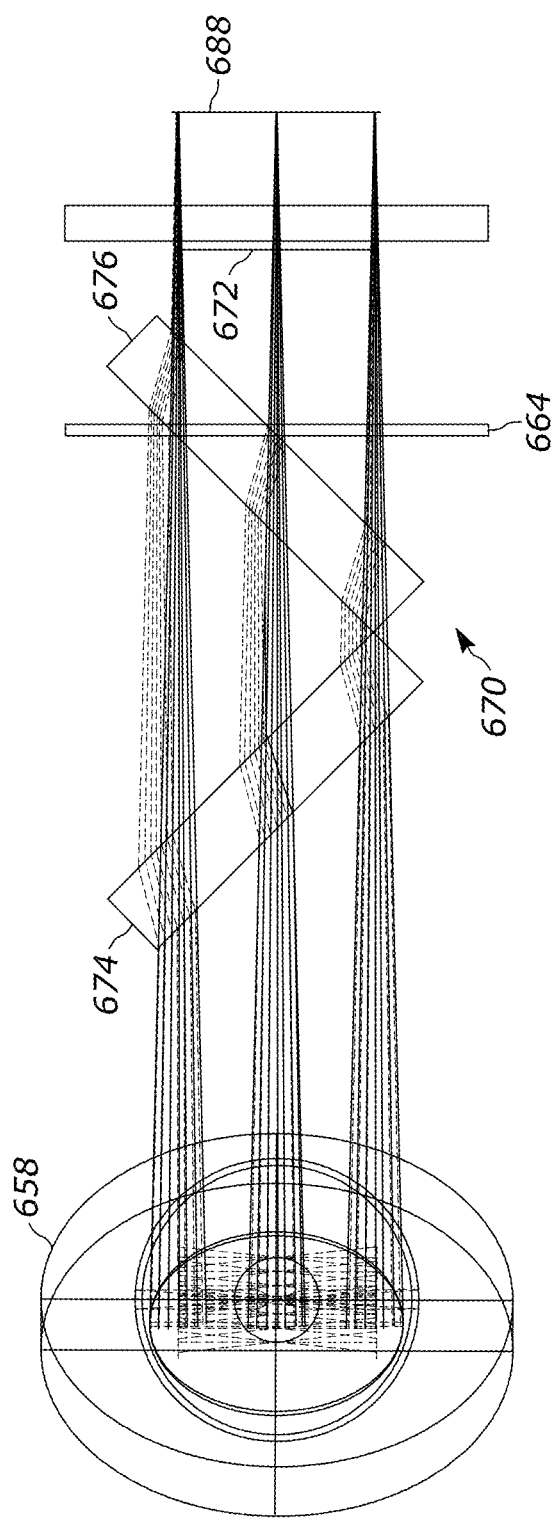

FIGS. 11A-11D illustrate an example turn reflector correction assembly 650 that induces wavelength-dependent spatial separation of an incident emission beam 652, which in this example results from fixed imaging optics 654, such as the imaging optics 108 and 206, receiving the emission beam from an exit surface 656 of a movable objective stage or other upstream optical assembly (see, FIG. 11A). As shown in FIG. 11A, a turn reflector 658 has a front face 658A and a back surface mirror 658B (e.g., a mirror positioned on or near the back surface of the reflector 658), each reflecting a different wavelength of incident light, generating two spatially separated beams 660 and 662, respectively. The first beam 660 contains a first compensation plate 664 within the beam path between the turn reflector 658 and a first sensor 668. The second beam 662 contains a compensation plate assembly 670 within the beam path between the turn reflector 658 and a second sensor 672. The emission divided into the first and second emission wavelengths may originate from the same position on the sample. As shown in FIG. 11B, the compensation plate 664 is oriented substantially perpendicular to the wavefront of the beam 660. As shown in FIG. 11C, however, the beam 662 confronts the compensation plate assembly 670 which, in the illustrated implementation, is formed of two tilted compensation plates 674 and 676. The plates 674 and 676 are tilted about the Z-axis as shown and by an equal and opposite amount compensating for one another. In the illustrated example, the compensation plates 674 and 676 are clocked, in that the turn reflector 658 is tilted about a X-axis while the compensation plates are tilted by rotating about a Z-axis, which corresponds to an optical axis from the exit surface 656. The beam 662 propagates along an optical axis corresponding to the Y-axis. FIG. 11D illustrates a side cross-sectional view of the turn reflector correction assembly 650.

Figure 12:
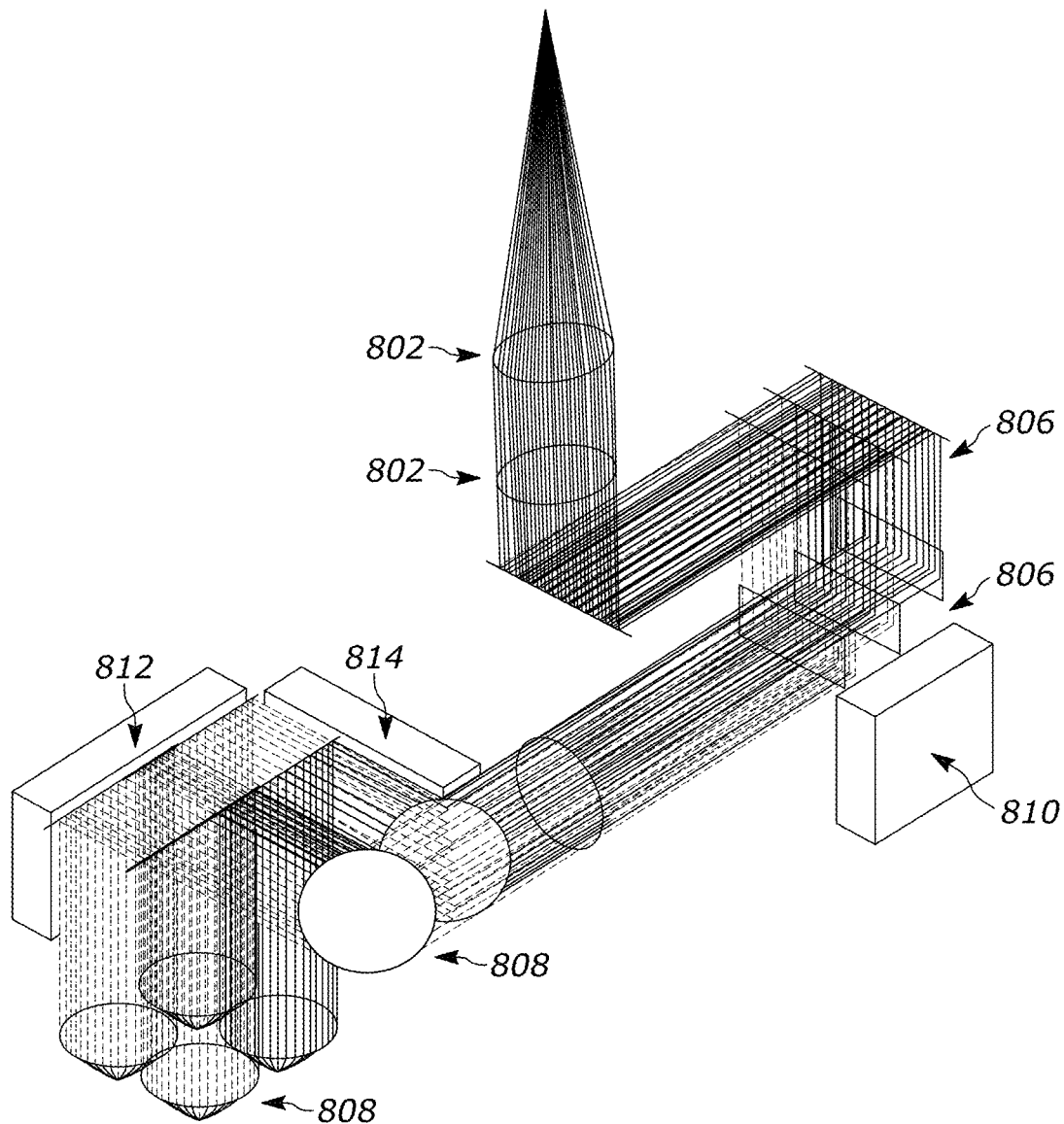
FIG. 12 illustrates a configuration of an apparatus having a movable objective stage capable of moving in two translational directions in accordance with the teachings of this disclosure.

To facilitate movement of the movable objective stage translatory movement may be achieved in two directions, both along the X-axis and the Y-axis. FIG. 12 illustrates an example configuration 800. A fixed imaging optics 802 is shown focusing an image of an emission from a sample onto a sensor (not shown) at a focal position 804. A turn reflector 806 provides the emission captured by an object lens apparatus 808 to the fixed imaging optics 802. In accordance with examples discussed above, the turn reflector 806 is able to translate along an Y-axis through movement of a Y-stage 810. The position of the objective lens apparatus 808, however, is additionally controlled to translate along the Y-axis and/or the X-axis via a separately controller Y-stage 812 and an X-stage 814. As shown, by having two translational movement stages, the object lens apparatus 808 is able to be moved in along the X- and Y-axes to allow for scanning across a large sample area or to allow movement of the apparatus to scan samples at different positions. Further by having the translational movement stage for the turn reflector 806, the optical path length can be maintained fixed from the movable object lens apparatus 808 through the fixed imaging optics 802, even as the former is moved, by additionally translating the turn reflector 806 a sufficient amount to keep compensate for induced shortening or lengthening of the optical path length.

Figure 13:
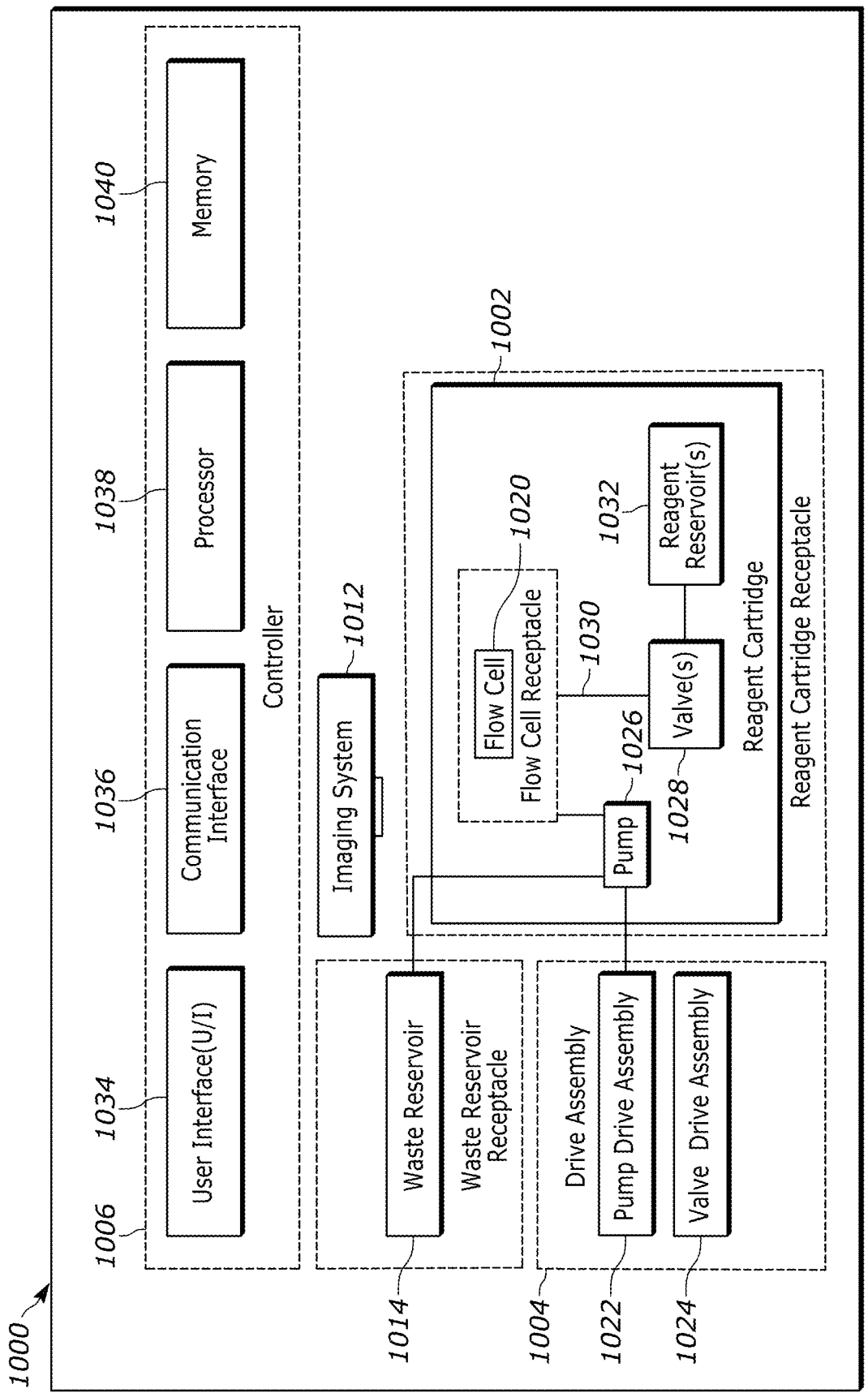
FIG. 13 illustrates a schematic diagram of an implementation of a system in accordance with the teachings of this disclosure.

FIG. 13 illustrates a schematic diagram of an implementation of a system 1000 in accordance with the teachings of this disclosure. The system 1000 can be used to perform an analysis on one or more samples of interest. The sample may include one or more DNA clusters that have been linearized to form a single stranded DNA (sstDNA). In the implementation shown, the system 1000 receives a reagent cartridge 1002 and includes, in part, a drive assembly 1004 and a controller 1006. The system 1000 also includes, an imaging system 1012, and a waste reservoir 1014. In other implementations, the waste reservoir 1014 may be included with the reagent cartridge 1002. The controller 1006 is electrically and/or communicatively coupled to the drive assembly 1004, and the imaging system 1012 and causes the drive assembly 1004, and/or the imaging system 1012 to perform various functions as disclosed herein.

The reagent cartridge 1002 carries the sample of interest that can be loaded into channels of a flow cell 1020. As used herein, a "flow cell" can include a device having a lid extending over a reaction structure to form a flow channel therebetween that is in communication with a plurality of reaction sites of the reaction structure, and can include a detection device that detects designated reactions that occur at or proximate to the reaction sites. The drive assembly 1004 interfaces with the reagent cartridge 1002 to flow one or more reagents (e.g., A, T, G, C nucleotides) through flow cell 1020 that interact with the sample.

In an implementation, a reversible terminator is attached to the reagent to allow a single nucleotide to be incorporated onto a growing DNA strand. In some such implementations, one or more of the nucleotides has a unique fluorescent label that emits a color when excited. The color (or absence thereof) is used to detect the corresponding nucleotide. In the implementation shown, the imaging system 1012 excites one or more of the identifiable labels (e.g., a fluorescent label) and thereafter obtains image data for the identifiable labels. The labels may be excited by incident light and/or a laser and the image data may include one or more colors emitted by the respective labels in response to the excitation. The image data (e.g., detection data) may be analyzed by the system 1000. The imaging system 1012 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 1004 interfaces with the reagent cartridge 1002 to flow another reaction component (e.g., a reagent) through the reagent cartridge 1002 that is thereafter received by the waste reservoir 1014 and/or otherwise exhausted by the reagent cartridge 1002. The reaction component performs a flushing operation that chemically cleaves the fluorescent label and the reversible terminator from the sstDNA. The sstDNA is then ready for another cycle.

Referring now to the drive assembly 1004, in the implementation shown, the drive assembly 1004 includes a pump drive assembly 1022, a valve drive assembly 1024, and an actuator assembly 192. The pump drive assembly 1022 interfaces with a pump 1026 to pump fluid through the reagent cartridge 1002 and/or the flow cell 1020 and the valve drive assembly 1024 interfaces with a valve 1028 to control the position of the valve 1028. The interaction between the valve 1028 and the valve drive assembly 1024 selectively actuates the valve 1028 to control the flow of fluid through fluidic lines 1030 of the reagent cartridge 1002. One or more of the fluidic lines 1030 fluidically couple one or more reagent reservoirs 1032 and the flow cell 1020. One or more of the valves 1028 may be implemented by a valve manifold, a rotary valve, a pinch valve, a flat valve, a solenoid valve, a reed valve, a check valve, a piezo valve, etc.

Referring to the controller 1006, in the implementation shown, the controller 1006 includes a user interface 1034, a communication interface 1036, one or more processors 1038, and a memory 1040 storing instructions executable by the one or more processors 1038 to perform various functions including the disclosed implementations. The user interface 1034, the communication interface 1036, and the memory 1040 are electrically and/or communicatively coupled to the one or more processors 1038.

In an implementation, the user interface 1034 receives input from a user and provides information to the user associated with the operation of the system 100 and/or an analysis taking place. The user interface 1034 may include a touch screen, a display, a key board, a speaker(s), a mouse, a track ball, and/or a voice recognition system. The touch screen and/or the display may display a graphical user interface (GUI).

In an implementation, the communication interface 1036 enables communication between the system 100 and a remote system(s) (e.g., computers) via a network(s). The network(s) may include an intranet, a local-area network (LAN), a wide-area network (WAN), the intranet, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 1038 and/or the system 100 may include one or more of a processor-based system(s) or a microprocessor-based system(s). In some implementations, the one or more processors 1038 and/or the system 100 includes a reduced-instruction set computer(s) (RISC), an application specific integrated circuit(s) (ASICs), a field programmable gate array(s) (FPGAs), a field programmable logic device(s) (FPLD(s)), a logic circuit(s), and/or another logic-based device executing various functions including the ones described herein.

The memory 1040 can include one or more of a hard disk drive, a flash memory, a read-only memory (ROM), erasable programmable read-only memory (EPROM), electrically erasable programmable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

At least one aspect of this disclosure is also directed to an apparatus and method for imaging including an imaging system that includes two separately movable optical stages: (i) a movable objective stage including an objective; and (ii) a movable imaging stage including imaging optics and an imaging sensor. The objective stage can be moved proximal to a sample of a plurality of samples for projecting a sampling beam onto the sample, and for capturing a fluorescence emission from the sample resulting from the sampling beam. The objective stage can include a coupler to receive the sampling beam via an optical fiber, for example. The objective stage and the imaging stage can be moved to maintain a substantially constant optical path length between the objective stage and the imaging stage.

The apparatus can counter move the imaging stage relative to the objective stage to reduce torque, rotating modes, and vibrations in the imaging system. The imaging stage can be moved opposite the objective stage by a generally equal amount, for example. The masses of the objective stage and the imaging stage can be matched to further reduce torque, rotating modes, and/or vibrations in the imaging system. Forces used to move the objective stage and the imaging stage can be applied along centers of mass of the stages to further reduce rotational modes.

Figure 14:
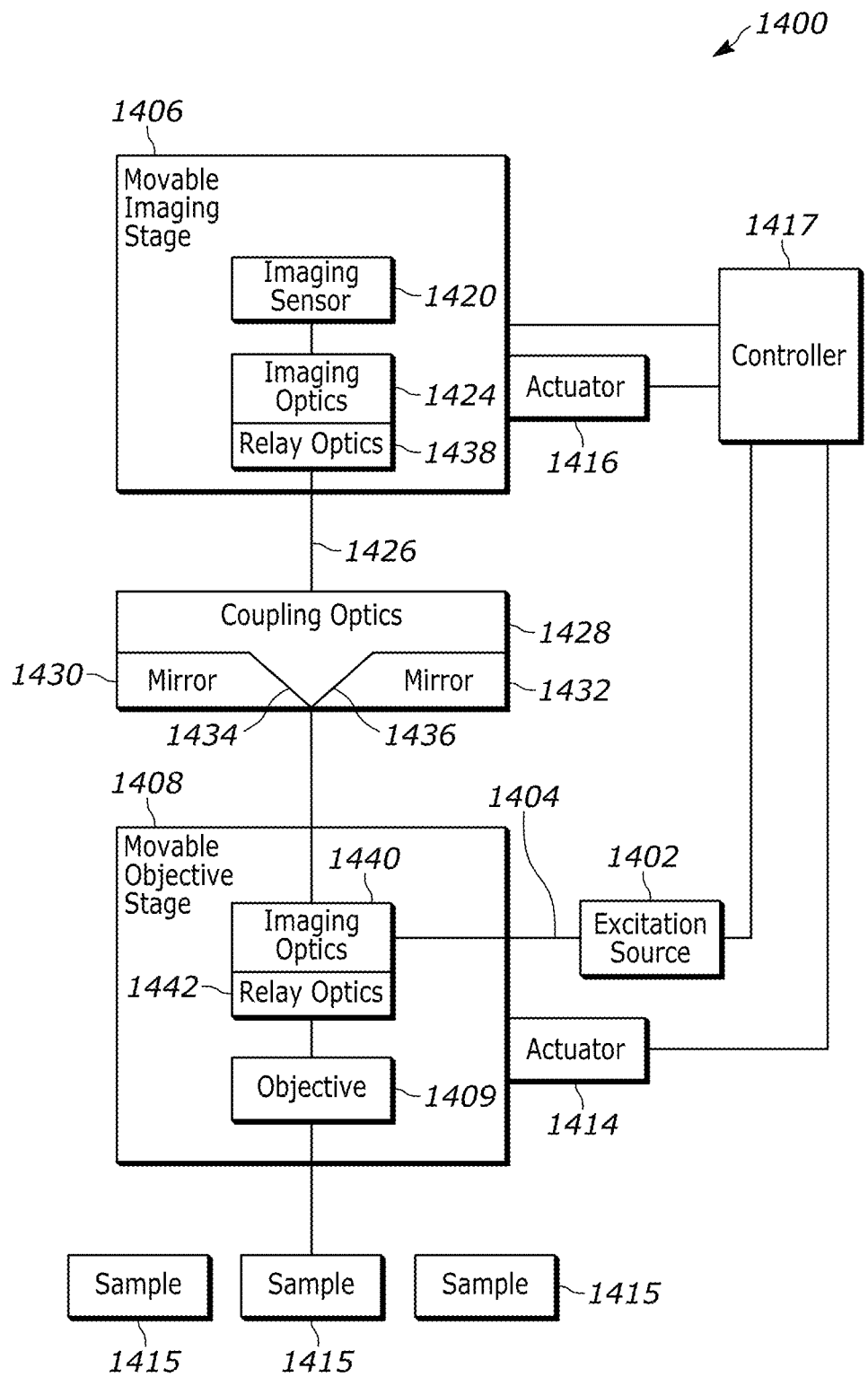
FIG. 14 is a schematic illustration of an example imaging system that can be used to implement the disclosed implementations.

FIG. 14 is a schematic illustration of an example imaging system 1400 that can be used to implement the disclosed implementations. The imaging system 1400 is shown including an excitation source 1402 for generating a sampling beam 1404, a movable imaging stage 1406, a movable objective stage 1408 including an objective 1409, a first actuator 1414 that is controllable for moving the objective stage 1408 between samples 1415, a second actuator 1416 that is controllable for moving the imaging stage 1406, and a controller 1417. The imaging system 1400 may be referred to as an apparatus.

The objective stage 1408 is configured to receive the sampling beam 1404 from the excitation source 1402, project the sampling beam 1404 onto the sample 1415, and capture an emission from the sample 1415 resulting from the sampling beam 1404. The imaging stage 1406 includes an imaging sensor 1420 and imaging optics 1424 for imaging the emission from the sample 1415 onto the imaging sensor 1420. The controller 1417 is configured to control the first actuator 1414 and the second actuator 1416 in operation such that the imaging stage 1406 moves counter to the objective stage 1408 to allow a length of an optical path 1426 between the objective 1409 and the imaging sensor 1420 to remain substantially constant. The controller 1417 thus controls the excitation source 1402, the imaging stage 1406, the objective stage 1408, the first actuator 1414, the second actuator 1416, and/or, more generally, the imaging system 1400 as a whole.

The imaging system 1400 includes coupling optics 1428 positioned between the objective stage 1408 and the imaging stage 1406 along the optical path 1426. The coupling optics 1428 are fixed in the implementation shown and include a pair of turning mirrors 1430, 1432 positioned between the objective stage 1408 and the imaging stage 1406 along the optical path 1426. The turning mirrors 1430, 1432 have faces 1434, 1436 positioned at approximately 45° angles. The faces 1434, 1436 may be positioned at another angle relative to one another, however.

The controller 1417 is configured to cause the first actuator 1414 to move the objective stage 1408 toward the coupling optics 1428 in operation and cause the second actuator 1416 to move the imaging stage 1406 away from the coupling optics 1428. The controller 1417 is also configured to cause the first actuator 1414 to move the objective stage 1408 away from the coupling optics 1428 in operation and cause the second actuator 1416 to move the imaging stage 1406 toward the coupling optics 1428. The optical path 1426 can have a substantially constant optical path length between the objective stage 1408 and the imaging stage 1406 as a result of moving the objective stage 1408 and the imaging stage 1406 in different directions.

The imaging optics 1424 of the imaging stage 1406 has relay optics 1438 and the objective stage 1408 also has imaging optics 1440 including relay optics 1426. The relay optics 1438 of the imaging stage 1406 and the relay optics 1442 of the objective stage 1408 focus and/or reshape the beam to compensate for spatial dispersion between the objective stage 1408 and the imaging stage 1406. The relay optics 1438, 1442 thus compensate for a long optical path 1426 between the objective 1409 and the imaging sensor 1420, in some implementations.

At least one of the first actuator 1414 or the second actuator 1416 may include a drive motor, a linear motor, a voice coil motor, a ball screw, a stepper motor, or a belt drive. Other types of actuators 1414, 1416 may prove suitable, however.

The excitation source 1402 can be a laser source, a light emitting diode, or any other source of excitatory illumination useful for fluorescence spectroscopy, or other purposes. The excitation source 1402 may generate the sampling beam 1404 to have a single central wavelength. The excitation source 1402 may alternatively include two or more excitation sources, each producing a respective excitation at a different wavelength.

The imaging stage 1406 can include the imaging optics 1424 having any number and/or type(s) of optical components for imaging or projecting emissions from the sample 1415 onto the imaging sensor 1420. The optical components may include lenses, tube lenses, apertures, mirrors, etc.

The objective stage 1408 can also include the imaging optics 1440 comprising any number and/or type(s) of optical components for imaging or projecting emissions from the sample 1415 onto the imaging stage 1406. Example optical components include lenses, apertures, mirrors, etc. The imaging optics 1440 can also include one or more turning mirrors 1430, 1432 for re-directing the sampling beam 1404 from an input optical fiber coupler (not shown for clarity of illustration) toward the objective 1409 and the sample 1415, and/or re-directing emissions from the sample 1415 toward the imaging stage 1406.

The imaging sensor 1420 captures image data representing images of emissions from the sample 1415 resulting from the sampling beam 1404. The imaging sensor 1420 can be any solid-state imaging device, such as a charge coupled device (CCD), a complementary metal oxide semiconductor (CMOS) device, or any suitable imaging sensor that can be used in fluorescence spectroscopy, or for other purposes.

While not shown for clarity of illustration, the controller 1417 (or any of the controllers described and/or illustrated herein) can include one or more processors, one or more computer-readable memories storing computer-readable instructions that can be executed by the one or more processors to perform various functions including the disclosed implementation, a user interface, and a communication interface electrically and/or communicatively coupled to the one or more processors, as are the one or more memories.

The user interface can be adapted to receive input from a user and to provide information to the user associated with the operation of the imaging system 1400. The user interface can include a touch screen, a display, a keyboard, a speaker (s), a mouse, a track ball, and/or a voice recognition system. The touch screen and/or the display can display a graphical user interface (GUI).

The communication interface can be adapted to enable communication between the imaging system 1400 and a remote system(s) (e.g., computers) via one or more network (s). The network(s) can include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system can be associated with analysis results, imaging data, etc. generated or otherwise obtained by the imaging system 1400.

The one or more processors of the controller 1417 can include one or more of a processor-based system(s) or a microprocessor-based system(s). In some implementations, the one or more processors include one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The one or more computer-readable memories can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

In the following examples and the claims of this patent, references are made to axes, orientations, parallel aspects, perpendicular aspect, same amounts, positions, proximal, etc. While such relationships can be precise, persons of ordinary skill in the art will readily appreciate that in practice such relationships will not, and need not be precise, but will have associated tolerances or differences. Such tolerances and differences can be due to, for example, manufacturing tolerances, alignment tolerances, wear, etc. Moreover, terms such as, but not limited to, approximately, generally, substantially, etc. are used herein to indicate that a precise value is not required, need not be specified, etc. For example, a first value being approximately a second value means that from a practical implementation perspective they can be considered as if equal. As used herein, such terms will have ready and instant meaning to one of ordinary skill in the art. The terms "substantially," "essentially," "approximately," "about," "generally," or any other version thereof, can be defined as being close to as understood by one of ordinary skill in the art, and in one non-limiting embodiment the term is defined to be within 10%, in another embodiment within 5%, in another embodiment within 1%, and in another embodiment within 0.5%.

Figure 15:
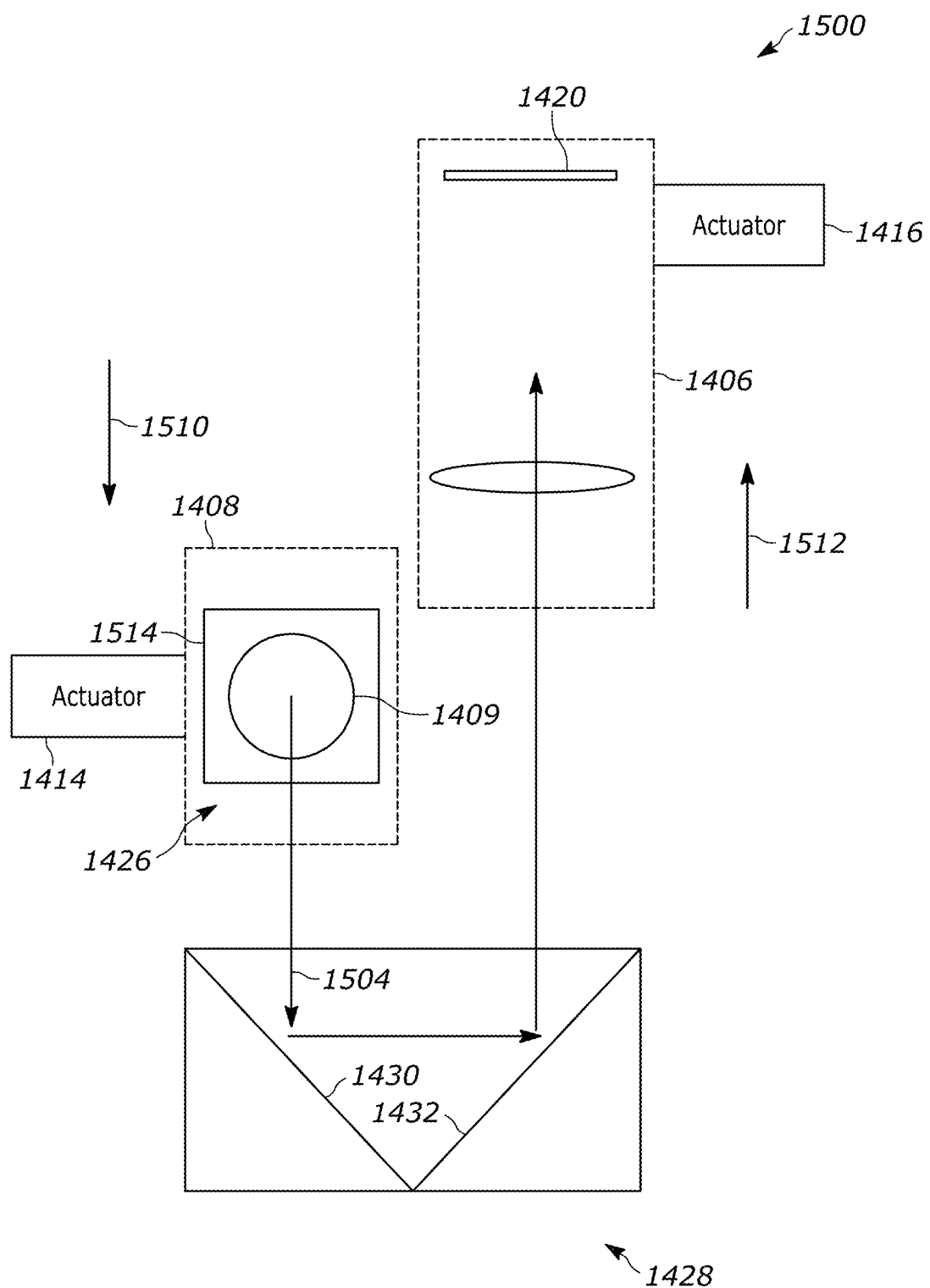
FIG. 15 is a top down view of a portion of an example imaging system that can be used to implement the imaging system of FIG. 14.

FIG. 15 is a top down view of a portion of an example imaging system 1500 that can be used to implement the imaging system 1400 of FIG. 14. The imaging system 1500 includes the imaging stage 1406, the objective stage 1408, and the coupling optics 1428. The coupling optics 1428 include a pair of turn mirrors 1430, 1432. The turn mirrors 1430, 1432 are fixed in the implementation shown and the imaging stage 1406 and the objective stage 1408 move relative to the fixed mirrors and in directions generally indicated by arrows 1510, 1512.

The x-axis may be oriented right and left across the page, the y-axis may be oriented up and down the page, and the z-axis may be oriented into and out of the page in the orientation of the illustrated example of FIG. 15. The optical axis of the objective 1409 is oriented generally parallel to the z-axis in the implementation shown such that the objective 1409 can be used to image a sample 1415 beneath the imaging system 1500. The sample 1415 is beneath the page in the orientation of FIG. 15. The objective 1409 can be moved by the actuator 1414 up and down generally parallel to the y-axis in a direction generally indicated by arrows 1510, 1512, such that the objective 1409 can be selectively positioned generally above a particular sample 1415 located beneath the imaging system 1500.

The imaging optics 1440 of FIG. 15 include a mirror 1514 that redirects emissions 1504 from a sample 1415 that are passing upward through the objective 1409 towards the pair of turning mirrors 1430 and 1432 of the coupling optics 1428. The turning mirrors 1430, 1432 turn the emissions 1504 twice and, thus, back towards and into the imaging stage 1406, as shown.

The controller 1417 controls the actuator 1414 to move the objective stage 1408 up away from the turning mirrors 1430, 1432 in the direction generally indicated by arrow 1512 and controls the actuator 1416 and causes the imaging stage 1406 to move down towards the turning mirrors 1430, 1432 in the direction generally indicated by arrow 1510 by generally the same amount at generally the same time. The controller 1417 similarly controls the actuator 1414 to move the objective stage 1408 down towards the turning mirrors 1430, 1432 and in the direction generally indicated by arrow 1510 and controls the actuator 1416 and causes the imaging stage 1406 to move up away from the turning mirrors 1430, 1432 in the direction generally indicated by arrow 1512 by generally the same amount at generally the same time. The length of the optical path 1426 from a sample 1415 to the imaging sensor 1420 can remain substantially constant by counter moving the imaging stage 1406 and the objective stage 1408 in this fashion. The illustrated example of FIG. 2 can be implemented to have a generally net zero applied force in the y-axis direction, which can help reduce vibrations in the y-axis direction. However, it may experience torque, which may cause a rotating mode.

Figure 16:
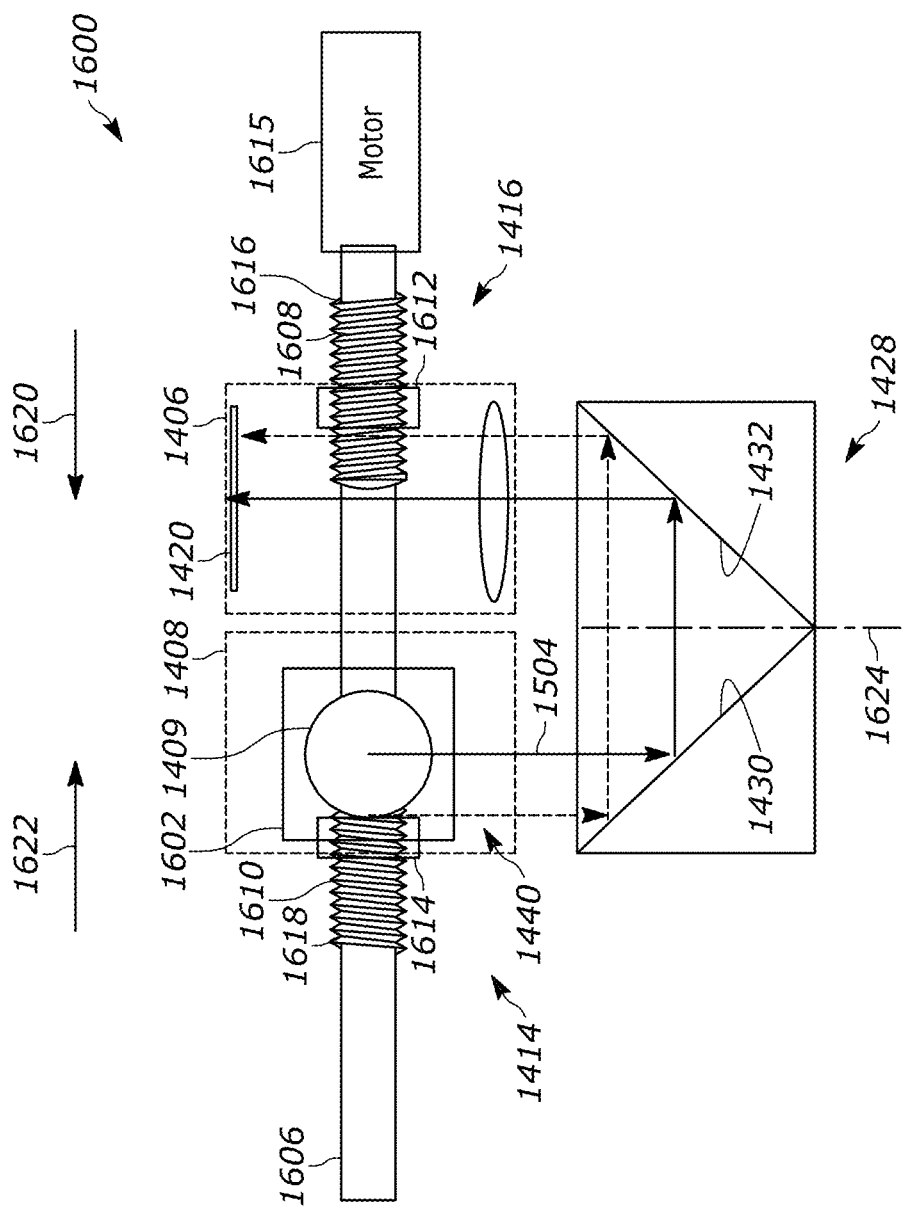
FIG. 16 is a top down view of a portion of another example imaging system that can be used to implement the imaging system of FIG. 14.

FIG. 16 is a top down view of a portion of another example imaging system 1600 that can be used to implement the imaging system 1400 of FIG. 14. The actuators 1414, 1416 are implemented by a shaft 1606 having a first threaded portion 1608 and a second threaded portion 1610, corresponding ball nuts 1612, 1614, and a motor 1615 to rotate the shaft 1606. The imaging stage 1406 is shown carrying the first ball nut 1612 and the objective stage 1408 is shown carrying the second ball nut 1614. While described herein as using the shaft 160 and ball nuts 1612, and 1614, other methods and components may be used to maintain the positional relationship between the imaging stage 1406 and the objective stage 1408. For example, the imaging system 1600 may implement one or more cables, belt drive trains, or linkage bars operatively coupled to the imaging and objective stages 1406 and 1408 to control the relative positions of the imaging and objective stages 1406 and 1408.

The first threaded portion 1608 has threads 1616 facing a first direction and the second threaded portion 1610 has threads 1618 facing a second direction different from the first direction. The threads 1616, 1618 facing different directions allows the first and second threaded portions 1608, 1610 to interact with the ball nuts 1612, 1614 and move the ball nuts 1612, 1614 toward one another in directions generally indicated by arrows 1620, 1622 or away from one another in directions generally opposite the direction indicated by arrows 1620, 1622 when the motor 1615 rotates the shaft 1606. The illustrated example of FIG. 16 can be implemented to have generally net zero applied forces and torque, which can help reduce vibrations in the y-directions and reduce rotating modes. Large mirrors 1430, 1432 may be used depending on the distance the objective stage 1408 is able to be moved, however. The imaging system 1600 may also include the relay optics 1438, 1442 that may allow the mirrors 1430, 1432 to be a smaller size.

The x-axis may be oriented right and left across the page, the y-axis may be oriented up and down the page, and the z-axis may be oriented into and out of the page in the orientation of the illustrated example of FIG. 16. The optical axis of the objective 1409 may be oriented generally parallel to the z-axis such that the objective 1409 can be used to image a sample 1415 beneath the imaging system 1600. The sample 1415 is beneath the page in the orientation of FIG. 16. The objective 1409 can be moved by the actuator 1414 left and right generally parallel to the x-axis in directions generally indicated by arrows 1620, 1622, such that the objective 1409 can be selectively positioned generally above a particular sample 1415 located beneath the imaging system 1600.

The controller 1417 can control the actuator 1416 to counter move the imaging stage 106 right away a midline 1624 by generally the same amount at generally the same time when the controller 1417 controls the actuator 1414 to move the objective stage 1408 left away from a midline 1624 of the turning mirrors 1430, 1432 during use. The controller 1417 can similarly control the actuator 1416 to counter move the imaging stage 1406 left towards the midline 1624 by generally the same amount at generally the same time when the controller 1417 controls the actuator 1414 to move the objective stage 1408 right towards the midline 1624. The length of the optical path 1426 from a sample 1415 to the imaging sensor 1420 can remain substantially constant by counter moving the imaging stage 1406 and the objective stage 1408 in this fashion, as shown.

Figure 17:
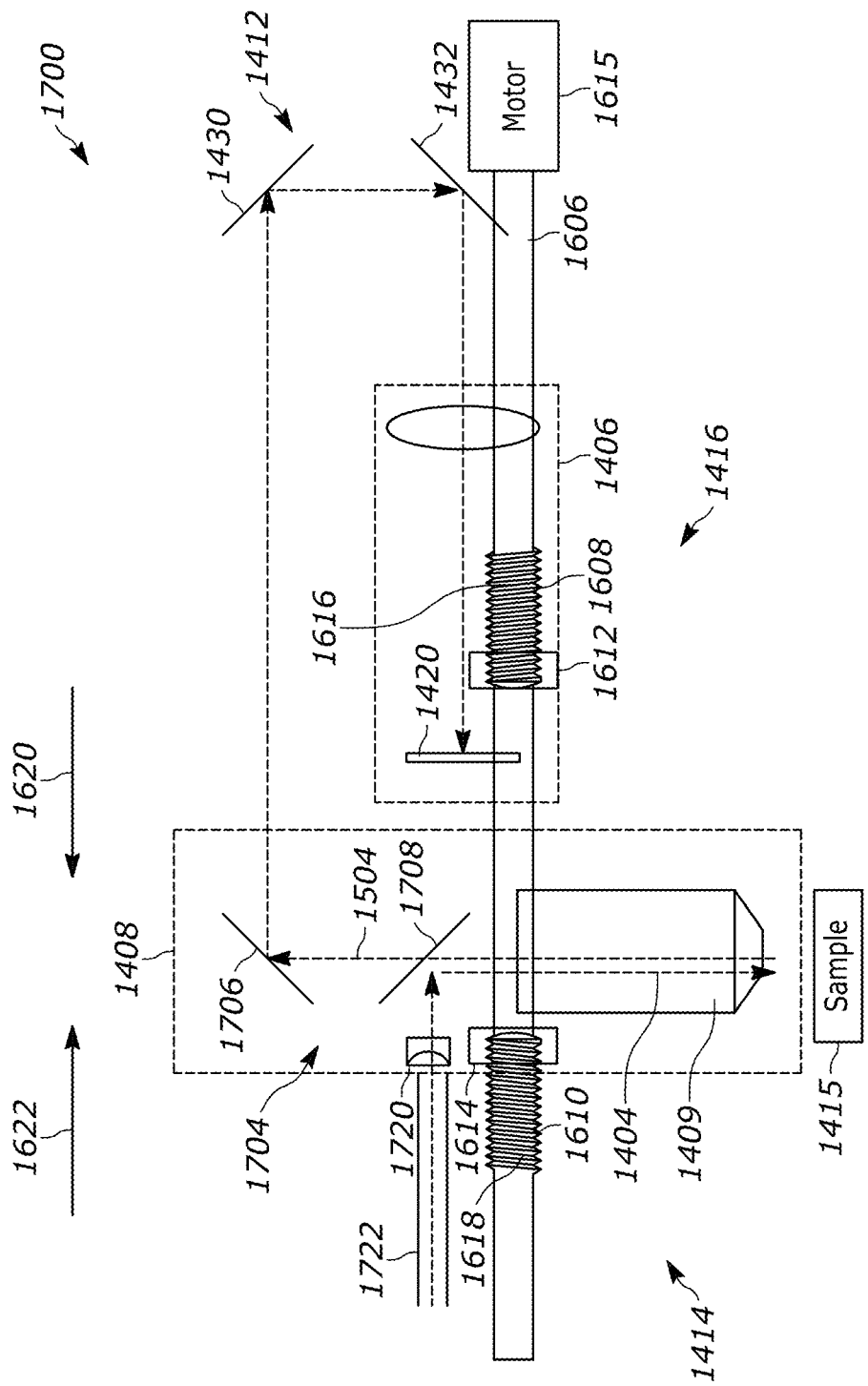
FIG. 17 is a side view of a portion of yet another example imaging system that can be used to implement the imaging system of FIG. 14.

FIG. 17 is a side view of a portion of yet another example imaging system 1700 that can be used to implement the imaging system 1400 of FIG. 14. The imaging system 1700 of FIG. 17 is similar to the imaging system 1600 of FIG. 16. The objective stage 1408 of the imaging system 1700 further includes second coupling optics 1704, however. The second coupling optics 1704 may be part of the imaging optics 1440 of the imaging system 1400 of FIG. 14. The coupling optics 1428 includes the first pair of turning mirrors 1430, 1432 and the second coupling optics 1704 includes a second pair of turning mirrors 1706, 1708. One of the second pair of turning mirrors 1708 redirects the sampling beam 1404 onto the sample 1415 and the other of the second pair of turning mirrors 1706 redirects emissions 1504 from the sample 1415 toward the first pair of turning mirrors 1430, 1432. The mirror 1706 thus redirects emissions 1504 from a sample 1415 that are passing upward through the objective 1409 towards the pair of turning mirrors 1430 and 1432 of the coupling optics 1428. The illustrated example of FIG. 17 can be implemented to have generally net zero applied forces and torque, which can help reduce vibrations in the y-directions and reduce rotating modes. The imaging system 1700 can include the relay optics 1438, 1442 in some implementations to reduce effects of a long optical path 1426 from the sample 1415 to the imaging sensor 1420.

The x-axis may be oriented right and left across the page, the y-axis may be oriented into and out of the page, and the z-axis may be oriented up and down the page in the orientation of the illustrated example of FIG. 17. The optical axis of the objective 1409 may be oriented upright, generally parallel to the z-axis such that the objective 1409 can be used to image a sample 1415 beneath the imaging system 1700 in the implementation shown. The objective 1409 can be moved by the actuator 1414 left and right generally parallel to the x-axis and in directions generally indicated by arrows 1620, 1622, such that the objective 1409 can be selectively positioned generally above a particular sample 115 located beneath the imaging system 1700.

The controller 1417 controls the actuator 1414 to move the objective stage 1408 left and in the direction generally indicated by arrow 1620 during use and the controller 1417 can control the actuator 1416 to counter move the imaging stage 106 right and in the direction generally indicated by arrow 1622 by generally the same amount at generally the same time. The controller 1417 can similarly control the actuator 1416 to counter move the imaging stage 106 left in the direction generally indicated by arrow 1620 by generally the same amount at generally the same time when the controller 1417 controls the actuator 1414 to move the objective stage 1408 right and in the direction generally indicated by the arrow 1622. The length of the optical path 1426 from a sample 1415 to the imaging sensor 1420 can remain substantially constant by counter moving the imaging stage 1406 and the objective stage 1408 in this fashion, as shown.

The objective stage 1408 includes a coupler 1720 in the implementation shown to receive the sampling beam 1404 via an optical fiber 1722. The optical fiber 1722 is flexible to accommodate changes in distance between the excitation source 1402 and the objective stage 1408 to maintain a generally constant length of the excitation optical path 1426 from the excitation source 1402 to the sample 1415. While not shown in FIGS. 15 and 16 for clarity of illustration, the sampling beam 1404 can be similarly coupled to the objective stage 1408 in the imaging systems 1500 and 1600.

Figure 18:
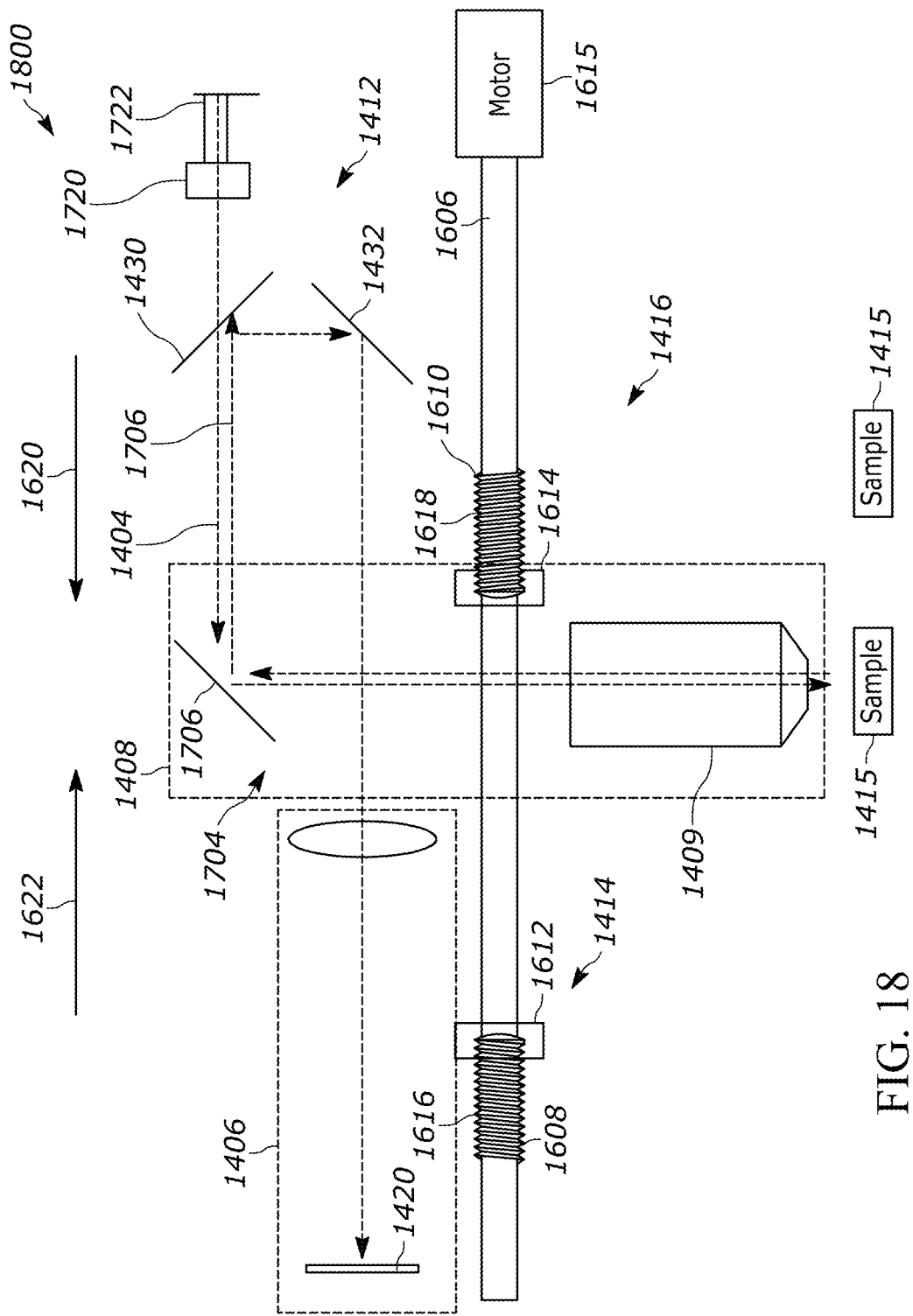
FIG. 18 is a side view of a portion of another example imaging system that can be used to implement the imaging system of FIG. 14.

FIG. 18 is a side view of a portion of another example imaging system 1800 that can be used to implement the imaging system 100 of FIG. 14. The imaging system 1800 of FIG. 18 is similar to the imaging system 1700 of FIG. 17. The imaging system 1800 includes the imaging stage 1406 in a different position to fold the optical path and reduce its length and the turning mirror 1708 is omitted, however. The coupling optics 1428 includes the pair of turning mirrors 1430, 1432 and the second coupling optics 1704 includes a second turning mirror 1706. The second turning mirror 1706 redirects the sampling beam 1404 onto the sample 1415 in the implementation shown and redirects the emissions 1504 from the sample 1415 toward the first pair of turning mirrors 1430, 1432.

The imaging systems 1500, 1600, 1700 and 1800 can be implemented such that forces moving the imaging stage 1406 and the objective stage 1408 are directed through their centers of mass to reduce the excitation of rotational modes that may cause an imaging system to rock on its isolators. A first center of mass of the imaging stage 1406 and a second center of mass of the objective stage 1408 move along generally a same axis, for example. An example axis is defined by a screw, ball screw, threaded shaft turned by a motor in some implementations, wherein the first and second actuators 1414, 1416 are respectively oppositely threaded regions of the screw, ball screw, threaded shaft. Moreover, the masses of the imaging stage 1406 and the objective stage 1408 can be matched to reduce torque and/or rotational modes. The objective stage 1408, the first actuator 1414, the imaging stage 1406, and the second actuator 1416 may thus be configured and arranged such that a first center of mass of the objective stage 1408 and a second center of mass of the imaging stage 1406 move along substantially a same axis. The objective stage 1408, the first actuator 1414, the imaging stage 1406, and the second actuator 1416 may also be configured and arranged such that moving the objective stage 1408 and the imaging stage 1406 at a same time results in substantially no net force applied to the imaging system 1800.

Figure 19:
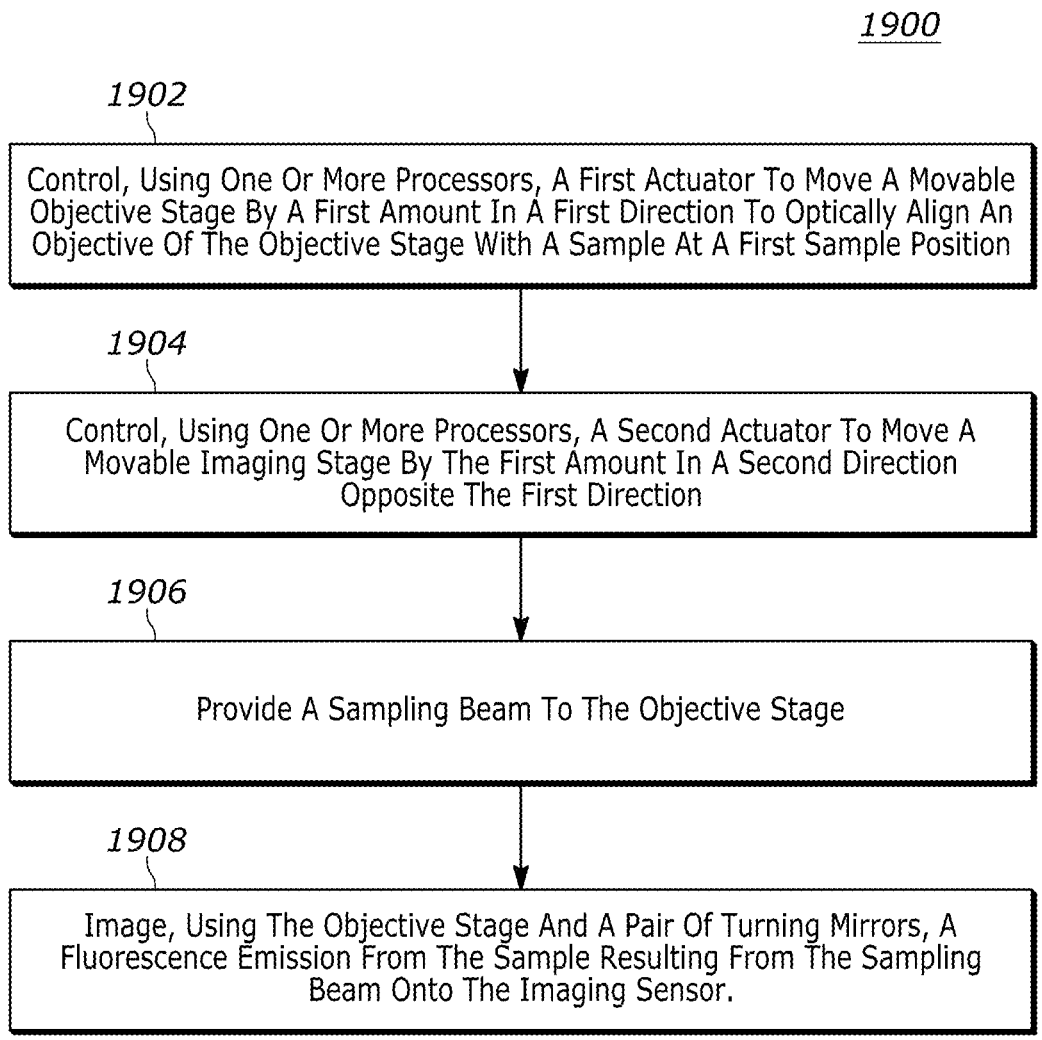
FIG. 19 is a flowchart representing an example method that can be used to operate the imaging systems of FIGS. 14-18 or any of the disclosed implementations.

FIG. 19 illustrates a flowchart for a method of operating any of the imaging systems 1400, 1500, 1600, 1700, 1800 disclosed herein. The order of execution of the blocks may be changed, and/or some of the blocks described may be changed, eliminated, combined and/or subdivided into multiple blocks.

The process of FIG. 19 begins with the first actuator 1414 being controlled using one or more processors to move the movable objective stage 1408 by a first amount in a first direction to optically align the objective 1409 of the objective stage 1408 with a sample 1415 at a first sample position (Block 1902). The second actuator 1416 is controlled using one or more processors to move a movable imaging stage 1406 by the first amount in a second direction opposite the first direction (Block 1904). The imaging stage 1406 includes the imaging sensor 1420. The objective stage 1408 and the imaging stage 1406 may be moved by the first amount in opposite directions to maintain a substantially constant optical path length between the objective 1409 and the imaging sensor 1420.

Controlling the first actuator 1414 may include controlling the first actuator 1414 to move the objective stage 1408 towards a pair of turning mirrors 1430, 1432 and controlling the second actuator 1416 may include controlling the second actuator 1416 to move the imaging stage 1406 away from the pair of turning mirrors 1430, 1432. Controlling the first actuator 1414 may alternatively include controlling the first actuator 1414 to move the objective stage 1408 away from the pair of turning mirrors 1430, 1432 and controlling the second actuator 1416 may include controlling the second actuator 1416 to move the imaging stage 1406 toward the pair of turning mirrors 1430, 1432.

The first actuator 1414 and the second actuator 1416 may include a shaft 1606 having a first threaded portion 1608 and a second threaded portion 1610, corresponding first and second ball nuts 1612, 1614, and a motor 1615 to rotate the shaft 1606 and controlling the first and second actuators 1414, 1416 may include controlling the motor 1615 to rotate the shaft 1606 such that the objective stage 1408 moves in the first direction, and the imaging stage 1406 moves in the second direction. Controlling the first actuator 1414 in such implementations may include controlling the first actuator 1414 to move the objective stage 1408 towards a midline 1624 of the pair of turning mirrors 1430, 1432 and controlling the second actuator 1416 may include controlling the second actuator 1416 to move the imaging stage 1406 away from the midline 1624 of the pair of turning mirrors 1430, 1432.

The sampling beam 1404 is provided to the objective stage 1408 (Block 1906). The objective stage 1408 is configured to project the sampling beam 1404 onto the sample 1415. A fluorescence emission from the sample 1415 resulting from the sampling beam 1404 onto the imaging sensor 1420 is imaged using the objective stage 1408 and the pair of turning mirrors 1430, 1432 (Block 1908). The method 1900 can be repeated to analyze other samples 1415.

Figure 20:
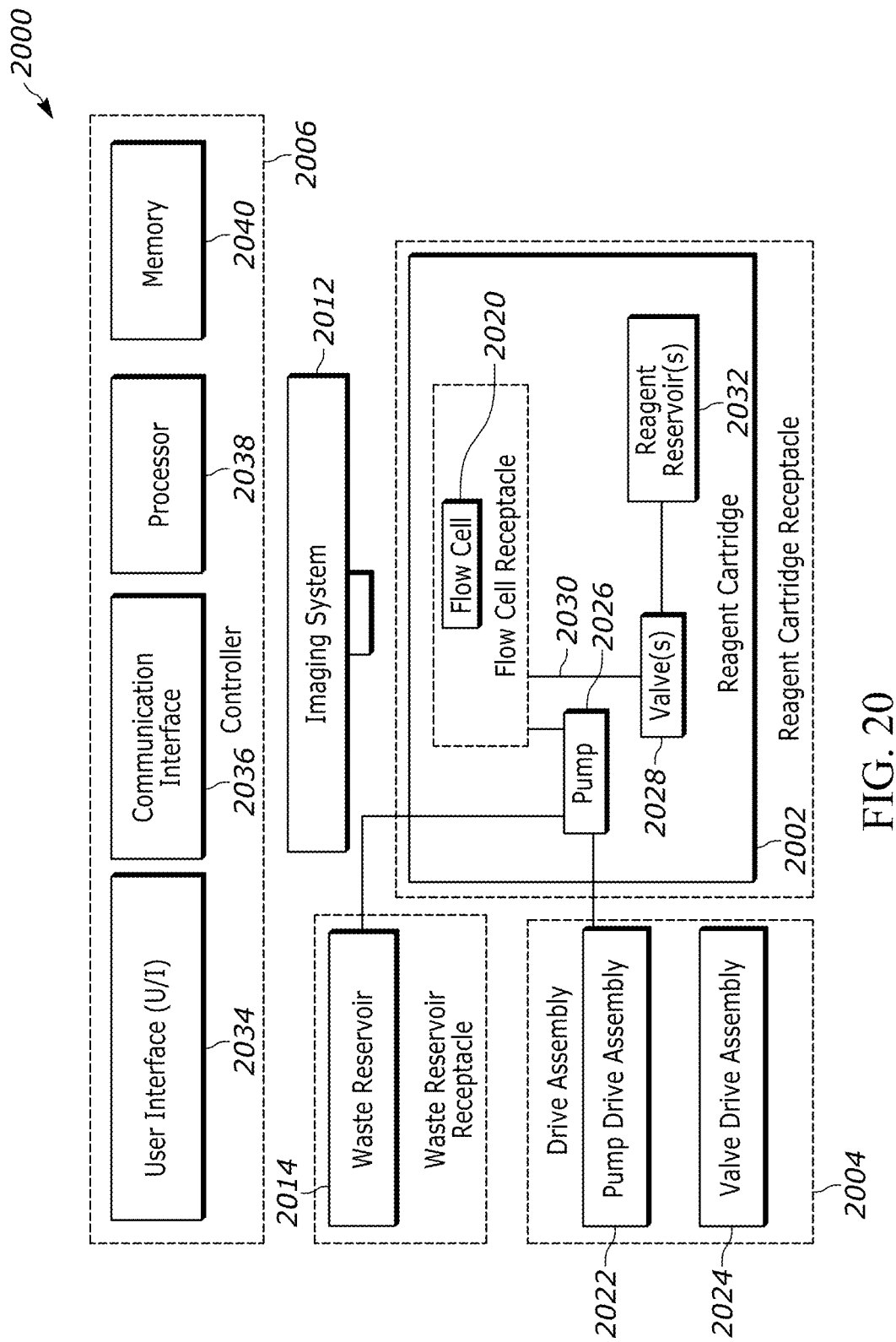
FIG. 20 illustrates a schematic diagram of an implementation of a system in accordance with the teachings of this disclosure.

FIG. 20 illustrates a schematic diagram of an implementation of an example system 2000 in accordance with the teachings of this disclosure. The system 2000 can be used to perform an analysis on one or more samples of interest. The sample can include one or more DNA clusters that have been linearized to form a single stranded DNA (sstDNA). In the implementation shown, the system 2000 receives a reagent cartridge 2002 and includes, in part, a drive assembly 2004 and a controller 2006. The system 2000 also includes an imaging system 2012 and a waste reservoir 2014. In other implementations, the waste reservoir 2014 can be included with the reagent cartridge 2002. The controller 2006 is electrically and/or communicatively coupled to the drive assembly 2004 and the imaging system 2012, and causes the drive assembly 2004 and/or the imaging system 2012 to perform various functions as disclosed herein.

The reagent cartridge 2002 carries the sample of interest that can be loaded into channels of a flow cell 2020. As used herein, a "flow cell" can include a device having a lid extending over a reaction structure to form a flow channel therebetween that is in communication with a plurality of reaction sites of the reaction structure, and can include a detection device that detects designated reactions that occur at or proximate to the reaction sites. The drive assembly 2004 interfaces with the reagent cartridge 2002 to flow one or more reagents (e.g., A, T, G, C nucleotides) through the flow cell 2020 that interact with the sample.

In an implementation, a reversible terminator is attached to the reagent to allow a single nucleotide to be incorporated onto a growing DNA strand. In some such implementations, one or more of the nucleotides has a unique fluorescent label that emits a color when excited. The color (or absence thereof) is used to detect the corresponding nucleotide. In the implementation shown, the imaging system 2012 excites one or more of the identifiable labels (e.g., a fluorescent label) and thereafter obtains image data for the identifiable labels. The labels can be excited by incident light and/or a laser and the image data can include one or more colors emitted by the respective labels in response to the excitation. The image data (e.g., detection data) can be analyzed by the system 2000. The imaging system 2012 can be a fluorescence spectrophotometer including an objective lens and/or a solid-state imaging device. The solid-state imaging device can include a CCD and/or a CMOS device. Example imaging systems 1400, 1500, 1600, 1700 and 1800 that can be used to implement the imaging system 2012 are described above in connection with FIGS. 14-19.

After the image data is obtained, the drive assembly 2004 interfaces with the reagent cartridge 2002 to flow another reaction component (e.g., a reagent) through the reagent cartridge 2002 that is thereafter received by the waste reservoir 2014 and/or otherwise exhausted by the reagent cartridge 2002. The reaction component performs a flushing operation that chemically cleaves the fluorescent label and the reversible terminator from the sstDNA. The sstDNA is then ready for another cycle.

Referring now to the drive assembly 2004, in the implementation shown, the drive assembly 2004 includes a pump drive assembly 2022, a valve drive assembly 2024, and an actuator assembly 192. The pump drive assembly 2022 interfaces with a pump 2026 to pump fluid through the reagent cartridge 2002 and/or the flow cell 2020 and the valve drive assembly 2024 interfaces with a valve 2028 to control the position of the valve 2028. The interaction between the valve 2028 and the valve drive assembly 2024 selectively actuates the valve 2028 to control the flow of fluid through fluidic lines 2030 of the reagent cartridge 2002. One or more of the fluidic lines 2030 fluidically couple one or more reagent reservoirs 2032 and the flow cell 2020. One or more of the valves 2028 can be implemented by a valve manifold, a rotary valve, a pinch valve, a flat valve, a solenoid valve, a reed valve, a check valve, a piezo valve, etc.

Referring to the controller 2006, in the implementation shown, the controller 2006 includes a user interface 2034, a communication interface 2036, one or more processors 2038, and computer-readable memory 2040 storing instructions executable by the one or more processors 2038 to perform various functions including the disclosed implementations. The user interface 2034, the communication interface 2036, and the memory 2040 are electrically and/or communicatively coupled to the one or more processors 2038.

In an implementation, the user interface 2034 receives input from a user and provides information to the user associated with the operation of the system 2000 and/or an analysis taking place. The user interface 2034 can include a touch screen, a display, a key board, a speaker(s), a mouse, a track ball, and/or a voice recognition system. The touch screen and/or the display can display a graphical user interface (GUI).

In an implementation, the communication interface 2036 enables communication between the system 2000 and a remote system(s) (e.g., computers) via a network(s). The network(s) can include an intranet, a LAN, a WAN, the intranet, etc. Some of the communications provided to the remote system can be associated with analysis results, imaging data, etc. generated or otherwise obtained by the system 2000. Some of the communications provided to the system 2000 can be associated with a fluidics analysis operation, patient records, and/or a protocol(s) to be executed by the system 2000.

The one or more processors 2038 and/or the system 2000 can include one or more of a processor-based system(s) or a microprocessor-based system(s). In some implementations, the one or more processors 2038 and/or the system 2000 includes a RISC, an ASIC, an FPGA, an FPLD, a logic circuit, and/or another logic-based device executing various functions including the ones described herein.

The memory 2040 can include one or more of a hard disk drive, a flash memory, a ROM, an EPROM, an EEPROM, a RAM, an NVRAM, a CD, a DVD, a cache, and/or any other storage device or storage disk in which information is stored for any duration (e.g., permanently, temporarily, for extended periods of time, for buffering, for caching).

An apparatus comprises: an imaging system having an excitation source for generating an excitation beam, a fixed imaging optics stage formed composed of an excitation source for generating an excitation beam, a sensor for measuring an emission from a sample, and an imaging optics for imaging the emission from the sample onto the sensor; and a movable objective stage proximal to the sample and positioned for providing the excitation beam onto the sample and for capturing the emission from the sample, where the movable objective stage includes an optical lens apparatus and a turn reflector optically coupled to the imaging optics of the fixed imaging optics stage, and where at least one of the optical lens apparatus and the turn reflector of the movable objective stage are movable relative to one another for scanning of the sample, while maintaining a fixed optical path length between the optical lens apparatus and a fixed plane in the fixed imaging optics stage during movement.

The apparatus of any one or more of the preceding implementations and/or any one or more of the implementations disclosed below, wherein the movable objective is movable in two orthogonal directions to maintain a fixed optical path length.

The apparatus of any one or more of the preceding implementations and/or any one or more of the implementations disclosed below, wherein excitation source comprises a first excitation source producing a first excitation at a first sampling wavelength that elicits a first sample emission range of wavelengths and a second excitation source producing a second excitation at a second sampling wavelength that elicits a second sample emission range of wavelengths, each of the first excitation, first emission, second excitation and second emission having a respective optical path.

The apparatus of any one or more of the preceding implementations and/or any one or more of the implementations disclosed below, further comprising: a compensation plate positioned in one of the respective optical paths.

The apparatus of any one or more of the preceding implementations and/or any one or more of the implementations disclosed below, further comprising: a compensation plate positioned in a plurality of the respective optical paths.

The apparatus of any one or more of the preceding implementations and/or any one or more of the implementations disclosed below, wherein both the optical lens apparatus and the turn reflector of the movable objective stage are movable relative to one another for scanning of a sample area.

The apparatus of any one or more of the preceding implementations and/or any one or more of the implementations disclosed below, wherein at least one of the optical lens apparatus and the turn reflector of the movable objective stage are movable relative to one another for scanning multiple samples areas at different positions.

The apparatus of any one or more of the preceding implementations and/or any one or more of the implementations disclosed below, further comprising: a controller configured to move the at least one of the optical lens apparatus and the turn reflector of the movable objective stage while maintaining the fixed optical path length to sample at the different positions.

The apparatus of any one or more of the preceding implementations and/or any one or more of the implementations disclosed below, wherein the controller is configured to continuously move the optical lens apparatus and the turn reflector of the movable objective between the different positions.

The apparatus of any one or more of the preceding implementations and/or any one or more of the implementations disclosed below, further comprising: a controller configured to continuously control movement of the turn reflector during capture of the emission beam from the sample to compensate for vibrational effects during capture.

The apparatus of any one or more of the preceding implementations and/or any one or more of the implementations disclosed below, further comprising: a controller configured to continuously control movement of the optical lens apparatus and the turn reflector during capture of the emission beam from the sample to compensate for vibrational effects during capture.

The apparatus of any one or more of the preceding implementations and/or any one or more of the implementations disclosed below, wherein the controller is configured to continuously control movement of the optical lens apparatus and the turn reflector at different movement increments.

The apparatus of any one or more of the preceding implementations and/or any one or more of the implementations disclosed below, further comprising: a controller configured to move the movable objective to achieve the fixed optical path length at each of the different sample positions.

The apparatus of any one or more of the preceding implementations and/or any one or more of the implementations disclosed below, further comprising: a z-stage adjustment controller to adjust a distance between the optical lens apparatus and the sample The apparatus of any one or more of the preceding implementations and/or any one or more of the implementations disclosed below, wherein the fixed imaging optics stage, the optical lens apparatus, and the turn reflector form a relay lens assembly for imaging the emission into the sensor.

The apparatus of any one or more of the preceding implementations and/or any one or more of the implementations disclosed below, wherein the fixed imaging optics stage, the optical lens apparatus, and the turn reflector form an infinite conjugate lens assembly or near infinite conjugate lens assembly.

The apparatus of any one or more of the preceding implementations and/or any one or more of the implementations disclosed below, wherein the fixed imaging optics stage and the optical lens apparatus with the turn reflector each form a finite conjugate lens assembly.

The apparatus of any one or more of the preceding implementations and/or any one or more of the implementations disclosed below, further comprising: one or more color separating elements between the objective and the fixed imaging optics to direct light of a first emission wavelength to a first image sensor and light of a second emission wavelength to a second image sensor.

The apparatus of any one or more of the preceding implementations and/or any one or more of the implementations disclosed below, further comprising: one or more color separating elements within or after the fixed imaging optics are to direct light of a first emission wavelength to a first image sensor and light of a second emission wavelength to a second image sensor.

The apparatus of any one of the preceding implementations and/or any one or more of the implementations disclosed below, wherein the movable objective stage is separately movable along two orthogonal axes each substantially planar to the sample.

The apparatus of any one or more of the preceding implementations and/or any one or more of the implementations disclosed below, further comprising: a compensating plate disposed before a first image sensor.

The apparatus of any one or more of the preceding implementations and/or any one or more of the implementations disclosed below, further comprising: a plurality of compensating plates disposed before a first image sensor.

The apparatus of any one or more of the preceding implementations and/or any one or more of the implementations disclosed below, further comprising: a plurality of compensating plates disposed before a first image sensor and a different compensation plate or a different plurality of compensating plates disposed before a second image sensor The apparatus of any one or more of the preceding implementations and/or any one or more of the implementations disclosed below, wherein one or more compensating plates is tilted or wedged.

The apparatus of any one or more of the preceding implementations and/or any one or more of the implementations disclosed below, wherein the movable objective stage is separately movable along two orthogonal axes each substantially planar to the sample.

An apparatus comprising: an imaging system having an excitation source for generating an excitation beam, a fixed imaging optics stage composed of a sensor for measuring an emission from a sample, and imaging optics for imaging the emission from the sample onto the sensor; and an objective stage proximal to the sample and positioned for providing the excitation beam onto the sample and for capturing the emission from the sample, where the objective stage includes an optical lens apparatus, wherein the imaging system comprises (i) one or more color separating elements between the objective and the fixed imaging optics to direct light of a first emission wavelength to a first image sensor of the sensor and light of a second emission wavelength to a second image sensor of the sensor, or (ii) the one or more color separating elements within or after the fixed imaging optics to direct light of the first emission wavelength to the first image sensor and light of the second emission wavelength to the second image sensor.

The apparatus of any one or more of the preceding implementations and/or any one or more of the implementations disclosed below, further comprising: a compensating plate disposed before a first image sensor.

The apparatus of any one or more of the preceding implementations and/or any one or more of the implementations disclosed below, further comprising: a plurality of compensating plates are disposed before a first image sensor.

The apparatus of any one or more of the preceding implementations and/or any one or more of the implementations disclosed below, wherein a plurality of compensating plates is disposed before a first image sensor and before a second image sensor.

The apparatus of any one or more of the preceding implementations and/or any one or more of the implementations disclosed below, wherein one or more compensating plates is tilted or wedged.

The apparatus of any one or more of the preceding implementations and/or any one or more of the implementations disclosed below, further comprising: a compensating plate pair disposed within a beam path defined by the one or more color separating elements.

The apparatus of any one or more of the preceding implementations and/or any one or more of the implementations disclosed below, wherein the compensating plate pair comprises a first compensating plate tilted in a first angular direction and a second compensating plate tilted in a second angular direction, equal and opposite to the first angular direction.

The apparatus of any one or more of the preceding implementations and/or any one or more of the implementations disclosed below, wherein the one or more color separating elements are tilted above a first axis and the first compensating plate and the second compensating plate are each tilted above a second axis orthogonal to the first axis.

A computer-implemented method of optically probing a sample, comprises: aligning, using one or more processors, a movable objective stage, having an optical lens apparatus and a turn reflector optically coupled to imaging optics of a fixed imaging optics stage, to align the optical lens apparatus with the sample for probing at an optical path length; providing, using the optical lens apparatus, an excitation beam to the sample and capturing, using the optical lens apparatus, a fluorescence emission from the sample; in response to identification of a shift in focus at the sample from the fluorescence emission, adjusting a position of the optical lens apparatus or a position of the turn reflector to compensate for the shift; and moving, using the one or more processors, the optical lens apparatus and the turn reflector to position the optical lens apparatus to over a subsequent sample for probing, while maintaining the optical path length.

The computer-implemented method of any one or more of the preceding implementations and/or any one or more of the implementations disclosed below, comprises: moving, using the one or more processors, the optical lens apparatus and the turn reflector to position the optical lens apparatus to over the subsequent sample for probing while maintaining the optical path length throughout the movement from the sample to the subsequent sample.

The computer-implemented method of any one or more of the preceding implementations and/or any one or more of the implementations disclosed below, comprises: performing imaging processing on image data containing the fluorescence emission; and in responding to determining the image data does not satisfy a focusing condition, adjusting a vertical distance between the optical lens apparatus and the sample until the image data satisfies the focusing condition.

The computer-implemented method of any one or more of the preceding implementations and/or any one or more of the implementations disclosed below, wherein moving the optical lens apparatus and the turn reflector to position the optical lens apparatus to over the subsequent sample for probing, while maintaining the optical path length comprises moving the optical lens apparatus and the turn reflector in a plane substantially parallel to a plane containing the sample and the subsequent sample.

An implementation of an apparatus, comprising: an excitation source for generating a sampling beam; a movable objective stage including an objective, the objective stage configured to receive the sampling beam from the excitation source, project the sampling beam onto a sample, and capture an emission from the sample resulting from the sampling beam; a movable imaging stage including an imaging sensor, and imaging optics for imaging the emission from the sample onto the imaging sensor; a first actuator controllable to move the objective stage between different sample positions; a second actuator controllable to move the imaging stage; and a controller configured to control the first actuator and the second actuator such that the imaging stage moves counter to the objective stage to allow a length of an optical path between the objective and the imaging sensor to remain substantially constant.

The apparatus of any one or more of the preceding implementations and/or any one or more of the implementations disclosed below, further comprising coupling optics positioned between the objective stage and the imaging stage along the optical path.

The apparatus of any one or more of the preceding implementations and/or any one or more of the implementations disclosed below, wherein the coupling optics are fixed.

The apparatus of any one or more of the preceding implementations and/or any one or more of the implementations disclosed below, wherein the coupling optics comprise a pair of turning mirrors positioned between the objective stage and the imaging stage along the optical path.

The apparatus of any one or more of the preceding implementations and/or any one or more of the implementations disclosed below, wherein the turning mirrors have faces positioned at approximately 45° angles.

The apparatus of any one or more of the preceding implementations and/or any one or more of the implementations disclosed below, wherein the controller is configured to cause the first actuator to move the objective stage toward the coupling optics and cause the second actuator to move the imaging stage away from the coupling optics.

The apparatus of any one or more of the preceding implementations and/or any one or more of the implementations disclosed below, wherein the controller is configured to cause the first actuator to move the objective stage away from the coupling optics and cause the second actuator to move the imaging stage toward the coupling optics.

The apparatus of any one or more of the preceding implementations and/or any one or more of the implementations disclosed below, wherein the imaging optics of the imaging stage comprise relay optics.

The apparatus of any one or more of the preceding implementations and/or any one or more of the implementations disclosed below, wherein the objective stage comprises imaging optics comprising relay optics.

The apparatus of any one or more of the preceding implementations and/or any one or more of the implementations disclosed below, wherein the relay optics of the imaging stage and the relay optics of the objective stage reshape at least one of the sampling beam or emission to compensate for spatial dispersion.

The apparatus of any one or more of the preceding implementations and/or any one or more of the implementations disclosed below, wherein at least one of the first actuator or the second actuator comprises a drive motor, a linear motor, a voice coil motor, a ball screw, a stepper motor, or a belt drive.

The apparatus of any one or more of the preceding implementations and/or any one or more of the implementations disclosed below, wherein the first actuator and the second actuator comprise a shaft having a first threaded portion and a second threaded portion, corresponding first and second ball nuts, and a motor to rotate the shaft, the imaging stage carrying the first ball nut and the objective stage carrying the second ball nut.

The apparatus of any one or more of the preceding implementations and/or any one or more of the implementations disclosed below, wherein the first threaded portion has threads facing a first direction and the second threaded portion has threads facing a second direction different from the first direction.

The apparatus of any one or more of the preceding implementations and/or any one or more of the implementations disclosed below, wherein the motor rotates the shaft in a first direction and causes the first ball nut and the second ball nut to move toward one another and wherein the motor rotates the shaft in a second direction and causes the first ball nut and the second ball nut to move away from one another.

The apparatus of any one or more of the preceding implementations and/or any one or more of the implementations disclosed below, wherein the objective stage further includes second coupling optics.

The apparatus of any one or more of the preceding implementations and/or any one or more of the implementations disclosed below, wherein the coupling optics comprise a first pair of turning mirrors and the second coupling optics comprise a second pair of turning mirrors.

The apparatus of any one or more of the preceding implementations and/or any one or more of the implementations disclosed below, wherein one of the second pair of turning mirrors redirects the sampling beam onto the sample.

The apparatus of any one or more of the preceding implementations and/or any one or more of the implementations disclosed below, wherein the other of the second pair of turning mirrors redirects the emissions from the sample toward the first pair of turning mirrors.

The apparatus of any one or more of the preceding implementations and/or any one or more of the implementations disclosed below, wherein the coupling optics comprise a pair of turning mirrors and the second coupling optics comprise a second turning mirror.

The apparatus of any one or more of the preceding implementations and/or any one or more of the implementations disclosed below, wherein the second turning mirror redirects the sampling beam onto the sample.

The apparatus of any one or more of the preceding implementations and/or any one or more of the implementations disclosed below, wherein the second turning mirror redirects the emissions from the sample toward the first pair of turning mirrors.

The apparatus of any one or more of the preceding implementations and/or any one or more of the implementations disclosed below, wherein the objective stage, the first actuator, the imaging stage, and the second actuator are configured and arranged such that a first center of mass of the objective stage and a second center of mass of the imaging stage move along substantially a same axis.

The apparatus of any one or more of the preceding implementations and/or any one or more of the implementations disclosed below, wherein the objective stage, the first actuator, the imaging stage, and the second actuator are configured and arranged such that moving the objective stage and the imaging stage at a same time results in substantially no net force applied to the apparatus.

An implementation of method, comprising: controlling, using one or more processors, a first actuator to move a movable objective stage by a first amount in a first direction to optically align an objective of the objective stage with a sample at a first sample position; controlling, using one or more processors, a second actuator to move a movable imaging stage by the first amount in a second direction opposite the first direction, wherein the imaging stage includes an imaging sensor, and moving the objective stage and the imaging stage by the first amount in opposite directions maintains a substantially constant optical path length between the objective and the imaging sensor; providing a sampling beam to the objective stage, the objective stage configured to project the sampling beam onto the sample; and imaging, using the objective stage and a pair of turning mirrors, a fluorescence emission from the sample resulting from the sampling beam onto the imaging sensor.

The method of any one or more of the preceding implementations and/or any one or more of the implementations disclosed below, wherein controlling the first actuator includes controlling the first actuator to move the objective stage towards a pair of turning mirrors, and wherein controlling the second actuator includes controlling the second actuator to move the imaging stage away from the pair of turning mirrors.

The method of any one or more of the preceding implementations and/or any one or more of the implementations disclosed below, wherein controlling the first actuator includes controlling the first actuator to move the objective stage towards a midline of the pair of turning mirrors, and wherein controlling the second actuator includes controlling the second actuator to move the imaging stage away from the midline of the pair of turning mirrors.

The method of any one or more of the preceding implementations and/or any one or more of the implementations disclosed below, wherein the first actuator and the second actuator comprise a shaft having a first threaded portion and a second threaded portion, corresponding first and second ball nuts, and a motor to rotate the shaft and wherein controlling the first and second actuators includes controlling the motor to rotate the shaft such that the objective stage moves in the first direction, and the imaging stage moves in the second direction.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
   an imaging system having an excitation source for generating an excitation beam, a fixed imaging optics stage composed of a sensor for measuring an emission from a sample, and imaging optics for imaging the emission from the sample onto the sensor; and
   a movable objective stage proximal to the sample and positioned for providing the excitation beam onto the sample and for capturing the emission from the sample, where the movable objective stage includes an optical lens apparatus and a turn reflector optically coupled to the imaging optics of the fixed imaging optics stage, and where at least one of the optical lens apparatus and the turn reflector of the movable objective stage are movable relative to one another for scanning of the sample, while maintaining a fixed optical path length between the optical lens apparatus and a fixed plane in the fixed imaging optics stage during movement.

2. The apparatus of claim 1, wherein the movable objective stage is movable in two orthogonal directions to maintain a fixed optical path length.

3. The apparatus of claim 1, wherein the excitation source comprises a first excitation source producing a first excitation at a first sampling wavelength that elicits a first sample emission range of wavelengths and a second excitation source producing a second excitation at a second sampling wavelength that elicits a second sample emission range of wavelengths, each of the first excitation, first emission, second excitation, and second emission having a respective optical path.

4. The apparatus of claim 3, further comprising a compensation plate positioned in one of the respective optical paths.

5. The apparatus of claim 3, further comprising a compensation plate positioned in a plurality of the respective optical paths.

6. The apparatus of claim 1, wherein both the optical lens apparatus and the turn reflector of the movable objective stage are movable relative to one another for scanning of a sample area.

7. The apparatus of claim 1, wherein at least one of the optical lens apparatus and the turn reflector of the movable objective stage are movable relative to one another for scanning multiple samples areas at different positions.

8. The apparatus of claim 7, further comprising a controller configured to move the at least one of the optical lens apparatus and the turn reflector of the movable objective stage while maintaining the fixed optical path length to sample at the different positions.

9. The apparatus of claim 8, wherein the controller is configured to continuously move the optical lens apparatus and the turn reflector of the movable objective stage between the different positions.

10. The apparatus of claim 1, further comprising a controller configured to continuously control movement of the turn reflector during capture of the emission beam from the sample to compensate for vibrational effects during capture.

11. The apparatus of claim 1, further comprising a controller configured to continuously control movement of the optical lens apparatus and the turn reflector during capture of the emission beam from the sample to compensate for vibrational effects during capture.

12. The apparatus of claim 11, wherein the controller is configured to continuously control movement of the optical lens apparatus and the turn reflector at different movement increments.

13. The apparatus of claim 1, further having a controller configured to move the movable objective stage to achieve the fixed optical path length at each of the different sample positions.

14. The apparatus of claim 1, further comprising a z-stage adjustment controller to adjust a distance between the optical lens apparatus and the sample.

15. The apparatus of claim 1, wherein the fixed imaging optics stage, the optical lens apparatus, and the turn reflector form a relay lens assembly for imaging the emission into the sensor.

16. The apparatus of claim 1, wherein the fixed imaging optics stage, the optical lens apparatus, and the turn reflector form an infinite conjugate lens assembly or near infinite conjugate lens assembly.

17. The apparatus of claim 1, wherein the fixed imaging optics stage and the optical lens apparatus with the turn reflector each form a finite conjugate lens assembly.

18. The apparatus of claim 1, comprising one or more color separating elements between the movable objective stage and the fixed imaging optics to direct light of a first emission wavelength to a first image sensor and light of a second emission wavelength to a second image sensor.

19. The apparatus of claim 1, wherein the movable objective stage is separately movable along two orthogonal axes each substantially planar to the sample.

20. The apparatus of claim 1, comprising one or more color separating elements within or after the fixed imaging optics to direct light of a first emission wavelength to a first image sensor and light of a second emission wavelength to a second image sensor.

21. The apparatus of claim 20, further comprising a compensating plate disposed before a first image sensor.

22. The apparatus of claim 20, further comprising a plurality of compensating plates disposed before a first image sensor.

23. The apparatus of claim 20, further comprising a plurality of compensating plates disposed before a first image sensor and a different compensation plate or different plurality of compensating plates disposed before a second image sensor.

24. The apparatus of claim 21, wherein one or more compensating plates is tilted or wedged.

25. The apparatus of claim 1, wherein the movable objective stage is separately movable along two orthogonal axes each substantially parallel to the sample.

26. An apparatus, comprising:
   an imaging system having an excitation source for generating an excitation beam, a fixed imaging optics stage composed of a sensor for measuring an emission from a sample, and imaging optics for imaging the emission from the sample onto the sensor; and
   an objective stage proximal to the sample and positioned for providing the excitation beam onto the sample and for capturing the emission from the sample, where the objective stage includes an optical lens apparatus, wherein the imaging system comprises
- (i) one or more color separating elements between the objective stage and the fixed imaging optics to direct light of a first emission wavelength to a first image sensor of the sensor and light of a second emission wavelength to a second image sensor of the sensor, or
- (ii) the one or more color separating elements within or after the fixed imaging optics to direct light of the first emission wavelength to the first image sensor and light of the second emission wavelength to the second image sensor.

27. The apparatus of claim 26, further comprising a compensating plate disposed before a first image sensor.

28. The apparatus of claim 26, wherein a plurality of compensating plates are disposed before a first image sensor.

29. The apparatus of claim 28, wherein a plurality of compensating plates is disposed before a first image sensor and a different plurality of compensating plates is disposed before a second image sensor.

30. The apparatus of claim 26, wherein one or more compensating plates is (are) tilted or wedged.

31. The apparatus of claim 26, further comprising a compensating plate pair disposed within a beam path defined by the one or more color separating elements.

32. The apparatus of claim 31, wherein the compensating plate pair comprises a first compensating plate tilted in a first angular direction and a second compensating plate tilted in a second angular direction, equal and opposite to the first angular direction.

33. The apparatus of claim 32, wherein the one or more color separating elements are tilted about a first axis and the first compensating plate and the second compensating plate are each tilted about a second axis orthogonal to the first axis and to the optical axis.

34. A computer-implemented method of optically probing a sample, the method comprising:
- aligning, using one or more processors, a movable objective stage, having an optical lens apparatus and a turn reflector optically coupled to imaging optics of a fixed imaging optics stage, to align the optical lens apparatus with the sample for probing at an optical path length;
- providing, using the optical lens apparatus, an excitation beam to the sample and capturing, using the optical lens apparatus, a fluorescence emission from the sample;
- in response to identification of a shift in focus at the sample from the fluorescence emission, adjusting a position of the optical lens apparatus or a position of the turn reflector to compensate for the shift; and
- moving, using the one or more processors, the optical lens apparatus and the turn reflector to position the optical lens apparatus to over a subsequent sample for probing, while maintaining the optical path length.

35. The computer-implemented method of claim 34, further comprising:
- moving, using the one or more processors, the optical lens apparatus and the turn reflector to position the optical lens apparatus to over the subsequent sample for probing while maintaining the optical path length throughout the movement from the sample to the subsequent sample.

36. The computer-implemented method of claim 34, further comprising:
- performing imaging processing on image data containing the fluorescence emission; and
- in responding to determining the image data does not satisfy a focusing condition, adjusting a vertical distance between the optical lens apparatus and the sample until the image data satisfies the focusing condition.

37. The computer-implemented method of claim 34, wherein moving the optical lens apparatus and the turn reflector to position the optical lens apparatus to over the subsequent sample for probing, while maintaining the optical path length comprises moving the optical lens apparatus and the turn reflector in a plane substantially parallel to a plane containing the sample and the subsequent sample.

* * * * *